(12) United States Patent
Fuda et al.

(10) Patent No.: US 11,371,130 B2
(45) Date of Patent: Jun. 28, 2022

(54) HOT-DIP SN—ZN-BASED ALLOY-PLATED STEEL SHEET

(71) Applicant: NIPPON STEEL CORPORATION, Tokyo (JP)

(72) Inventors: Masahiro Fuda, Tokyo (JP); Toshinori Mizuguchi, Tokyo (JP); Junji Nakano, Tokyo (JP); Yoshiharu Inoue, Tokyo (JP); Kazuhisa Kusumi, Tokyo (JP); Yasuaki Naito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/044,238

(22) PCT Filed: Apr. 26, 2019

(86) PCT No.: PCT/JP2019/017961
§ 371 (c)(1),
(2) Date: Sep. 30, 2020

(87) PCT Pub. No.: WO2019/208775
PCT Pub. Date: Oct. 31, 2019

(65) Prior Publication Data
US 2021/0156017 A1    May 27, 2021

(30) Foreign Application Priority Data

Apr. 26, 2018 (JP) .............................. JP2018-085487
Apr. 26, 2018 (JP) .............................. JP2018-085814

(51) Int. Cl.
*C23C 2/08* (2006.01)
*C23C 2/02* (2006.01)
(Continued)

(52) U.S. Cl.
CPC ................ *C23C 2/08* (2013.01); *B32B 15/01* (2013.01); *B32B 15/012* (2013.01);
(Continued)

(58) Field of Classification Search
CPC ......... C23C 30/00; C23C 30/005; C23C 2/08; C23C 2/02; C23C 2/06; C23C 2/26;
(Continued)

(56) References Cited

U.S. PATENT DOCUMENTS

| 5,827,618 A | 10/1998 | Oyagi et al. |
| 2003/0183626 A1 | 10/2003 | Tomimura et al. |

(Continued)

FOREIGN PATENT DOCUMENTS

| JP | 61-91390 A | 5/1986 |
| JP | 8-269735 A | 10/1996 |

(Continued)

OTHER PUBLICATIONS

"Cosmetic corrosion test method for automotive parts", Japanese Automobile Standard, JASO M 610-92, Mar. 30, 1992, The Society of Automotive Engineers of Japan, Inc., total of 12 pages.

*Primary Examiner* — Michael E. La Villa
(74) *Attorney, Agent, or Firm* — Birch, Stewart, Kolasch & Birch, LLP.

(57) ABSTRACT

A hot-dip Sn—Zn-based alloy-plated steel sheet according to an aspect of the present invention includes: a steel sheet having a predetermined chemical composition; a diffusion alloy layer provided on one surface or both surfaces of the steel sheet; and a Sn—Zn-plated layer provided on the diffusion alloy layer, in which the diffusion alloy layer contains Fe, Sn, Zn, Cr, and Ni, an area ratio of a Sn—Fe—Cr—Zn phase to a Sn—Fe—Ni—Zn phase in the diffusion alloy layer is 0.01 or more and less than 2.5, the diffusion alloy layer has a coverage of 98% or more with respect to the (Continued)

one surface, the Sn—Zn-plated layer contains 1% to 20% of Zn by mass % and a remainder consisting of Sn and impurities, and an adhesion amount of the Sn—Zn-plated layer is 10 to 80 g/m² per one surface.

9 Claims, 2 Drawing Sheets

(51) Int. Cl.
| | |
|---|---|
| C23C 28/02 | (2006.01) |
| C25F 1/06 | (2006.01) |
| C22C 13/00 | (2006.01) |
| C22C 38/06 | (2006.01) |
| C22C 38/02 | (2006.01) |
| C22C 38/04 | (2006.01) |
| C22C 38/00 | (2006.01) |
| C22C 38/42 | (2006.01) |
| C22C 38/48 | (2006.01) |
| C22C 38/50 | (2006.01) |
| C22C 38/54 | (2006.01) |
| C23C 2/06 | (2006.01) |
| C23C 2/26 | (2006.01) |
| C23C 2/28 | (2006.01) |
| B32B 15/01 | (2006.01) |
| C22C 38/58 | (2006.01) |
| C25D 5/36 | (2006.01) |
| C25D 7/06 | (2006.01) |
| C23C 28/00 | (2006.01) |
| C23C 30/00 | (2006.01) |
| B32B 15/18 | (2006.01) |
| C25D 5/50 | (2006.01) |
| B32B 15/04 | (2006.01) |
| C25F 1/02 | (2006.01) |
| C23C 2/40 | (2006.01) |
| C23C 2/04 | (2006.01) |
| C22C 38/08 | (2006.01) |
| C22C 38/18 | (2006.01) |
| C22C 38/26 | (2006.01) |
| C22C 38/28 | (2006.01) |
| C22C 38/32 | (2006.01) |
| C22C 38/20 | (2006.01) |
| C22C 38/22 | (2006.01) |
| C22C 38/16 | (2006.01) |
| C22C 38/44 | (2006.01) |
| C22C 38/46 | (2006.01) |
| C22C 38/12 | (2006.01) |
| C22C 38/24 | (2006.01) |
| C22C 38/40 | (2006.01) |
| C22C 38/14 | (2006.01) |

(52) U.S. Cl.
CPC ............ *B32B 15/013* (2013.01); *B32B 15/04* (2013.01); *B32B 15/043* (2013.01); *B32B 15/18* (2013.01); *C22C 13/00* (2013.01); *C22C 38/00* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/04* (2013.01); *C23C 2/06* (2013.01); *C23C 2/26* (2013.01); *C23C 2/28* (2013.01); *C23C 2/285* (2013.01); *C23C 2/40* (2013.01); *C23C 28/021* (2013.01); *C23C 28/023* (2013.01); *C23C 28/32* (2013.01); *C23C 28/321* (2013.01); *C23C 28/322* (2013.01); *C23C 30/00* (2013.01); *C23C 30/005* (2013.01); *C25D 5/36* (2013.01); *C25D 5/50* (2013.01); *C25D 7/06* (2013.01); *C25D 7/0614* (2013.01); *C25F 1/02* (2013.01); *C25F 1/06* (2013.01); *Y10T 428/1266* (2015.01); *Y10T 428/12611* (2015.01); *Y10T 428/12618* (2015.01); *Y10T 428/12667* (2015.01); *Y10T 428/12708* (2015.01); *Y10T 428/12715* (2015.01); *Y10T 428/12722* (2015.01); *Y10T 428/12792* (2015.01); *Y10T 428/12799* (2015.01); *Y10T 428/12958* (2015.01); *Y10T 428/12965* (2015.01); *Y10T 428/12972* (2015.01); *Y10T 428/12979* (2015.01); *Y10T 428/2495* (2015.01); *Y10T 428/24942* (2015.01); *Y10T 428/24967* (2015.01); *Y10T 428/26* (2015.01)

(58) Field of Classification Search
CPC .... C23C 2/28; C23C 2/04; C23C 2/40; C23C 2/285; C23C 28/021; C23C 28/023; C23C 28/32; C23C 28/321; C23C 28/322; B32B 15/01; B32B 15/012; B32B 15/013; B32B 15/04; B32B 15/043; B32B 15/18; C22C 13/00; C22C 38/00; C22C 38/002; C22C 38/02; C22C 38/04; C22C 38/06; C22C 38/42; C22C 38/48; C22C 38/50; C22C 38/54; C22C 38/58; C22C 38/08; C22C 38/12; C22C 38/14; C22C 38/16; C22C 38/18; C22C 38/20; C22C 38/22; C22C 38/24; C22C 38/26; C22C 38/28; C22C 38/32; C22C 38/40; C22C 38/44; C22C 38/46; C25F 1/06; C25F 1/02; C25D 7/06; C25D 7/0614; C25D 5/36; C25D 5/50; Y10T 428/12708; Y10T 428/12715; Y10T 428/12722; Y10T 428/12792; Y10T 428/12799; Y10T 428/24942; Y10T 428/2495; Y10T 428/24967; Y10T 428/12958; Y10T 428/12965; Y10T 428/12972; Y10T 428/12979; Y10T 428/1266; Y10T 428/12667; Y10T 428/12611; Y10T 428/12618; Y10T 428/26

See application file for complete search history.

(56) References Cited

U.S. PATENT DOCUMENTS

2009/0047542 A1\* 2/2009 Goto ..................... C23C 2/08
428/648
2009/0053551 A1 2/2009 Sakamoto et al.

FOREIGN PATENT DOCUMENTS

| JP | 2001-355051 A | 12/2001 |
|---|---|---|
| JP | 2002-38250 A | 2/2002 |
| JP | 2003-277992 A | 10/2003 |
| JP | 2009-68102 A | 4/2009 |

\* cited by examiner

HOT-DIP SN—ZN-BASED ALLOY-PLATED STEEL SHEET

TECHNICAL FIELD OF THE INVENTION

The present invention relates to a hot-dip Sn—Zn-based alloy-plated steel sheet applied to the fields of vehicles, home appliances, building materials, and the like, and a method of manufacturing the same, and particularly to a hot-dip Sn—Zn-based alloy-plated steel sheet excellent in plating appearance, corrosion resistance, and workability suitable for vehicle fuel tank applications, and a method of manufacturing the same.

Priority is claimed on Japanese Patent Application No. 2018-085487, filed on Apr. 26, 2018, and Japanese Patent Application No. 2018-085814, filed on Apr. 26, 2018, the contents of which are incorporated herein by reference.

RELATED ART

In recent years, high-strengthening in a steel sheet for a vehicle has proceeded for the purpose of improving fuel efficiency by reducing the weight of a vehicle body. Similarly, in steel sheets for fuel tanks, a reduction in the weight of a tank, a complicated vehicle body design, and furthermore, a complicated fuel tank shape due to the location where a fuel tank is accommodated and installed have proceeded, and excellent formability and high-strengthening have been required. In the related art, in order to satisfy the demand for compatibility between such formability and high strength, high strength IF steel in which solid solution strengthening elements such as P, Si, and Mn are further added to interstitial free (IF) steel obtained by adding carbonitride forming elements such as Ti and Nb to ultra low carbon steel has been developed.

For the reduction in weight, there is a demand for a reduction in the sheet thickness of a steel sheet, and accordingly, the corrosion resistance of the material has become more important than in the related art. Regarding the inner surface of a fuel tank, there is a demand for a steel sheet in which corrosion products that cause filter clogging are not generated against gasoline and alcohol, or organic acids generated by deterioration of gasoline, pitting corrosion does not occur. In addition, regarding the outer surface of a fuel tank, good corrosion resistance against various environments such as an area where snow-melting salt is sprayed and travelling in a hot and humid area. For these purposes, in the related art, plating of the surface of a steel sheet with a Pb—Sn alloy, an Al—Si alloy, a Sn—Zn-based alloy, or the like has been proposed and applied.

However, in a case where the inner and outer surfaces of the fuel tank are exposed to a severe corrosive environment, in rare cases, corrosion that leads to holes may occur. Materials used for fuel tanks are required to have sufficient durability and good corrosion resistance. In order to cope with such a severe corrosive environment, various surface-treated steel sheets have been hitherto developed. In particular, a steel sheet containing Cr and a steel sheet obtained by applying a Sn-based plating thereto are disclosed as promising techniques. However, it cannot be said that the techniques disclosed in the related art are sufficiently satisfactory in terms of the plating adhesion appearance on a steel sheet for realizing good corrosion resistance, plating properties such as adhesion, and a method for obtaining the same.

For example, Patent Document 1 discloses a steel sheet for a fuel container including a diffusion coating layer of Ni, Co, and a Ni—Co alloy and a plated layer coated layer of Sn and a Sn—Zn alloy on at least one surface of a steel sheet containing C: 0.02% or less, Cr: more than 3% to 20%, and acid-soluble Al: 0.005% to 0.10%.

Patent Document 2 discloses an antirust steel sheet for a fuel tank in which an alloy layer containing one or more of Ni, Fe, Sn, and Zn is provided in 1.5 μm or less per side on a steel containing C, Si, Mn, P, Al, and 0.2%≤Cr≤6%, and a tin-zinc alloy-plated layer is provided thereon, which contains tin: 80% to 99% and a remainder consisting of zinc and unavoidable impurities, contains zinc crystals having a major axis of 250 μm or more in 20/0.25 mm$^2$ or less, and has a thickness of 4 to 50 μm per side.

Patent Document 3 discloses a hot-dip Zn—Sn-plated steel sheet in which a hot-dip Zn—Sn-plated layer is provided on the surface of a steel sheet, the composition of the plated layer includes 1% to less than 50% of Sn in addition to Zn, Cr: 1% to 25% is contained in the steel, and a pre-plated layer containing Ni, Co, Fe, Cr, Sn, Zn, and Cu is provided at the interface between the plated layer and the steel sheet.

Patent Document 4 discloses a hot-dip Sn—Zn-plated steel sheet in which a hot-dip Sn—Zn-plated layer is provided on the surface of a steel sheet, the composition of the plated layer contains 1% to 50% of Zn in addition to Sn, the ratio of the plated layer (Zn % of the surface layer composition/Zn % of the entire plated layer) is 0.95 or less, and Cr: 3% to 25% is contained in the steel, and a hot-dip Sn—Zn-plated steel sheet including a pre-plated layer containing Ni, Co, Fe, Cr, Sn, Zn, and Cu at the interface between a plated layer and a steel sheet.

Patent Document 5 discloses a vehicle fuel tank or a fuel supply pipe in which a ferritic stainless steel sheet having a fracture elongation of 30% or more when processed by uniaxial tension and an $r_{min}$ value of Lankford value (r value) of 1.3 or more is used as a substrate, a ferritic stainless steel containing, by mass %, C: 0.015% or less, Si: 0.5% or less, Cr: 11.0% to 25.0%, N: 0.020% or less, Ti: 0.05% to 0.50%, Nb: 0.10% to 0.50%, and B: 0.0100% or less is used as the ferritic stainless steel sheet of the substrate, a steel sheet in which an Al-plated layer, a Zn-plated layer, or a plated layer formed of an alloy layer of Zn and one or more of Fe, Ni, Co, Mg, Sn, and Al is formed on the surface thereof is shaped into the substrate, a zinc-rich coating film is formed at a weld, and a cationic electrodeposition coating film is formed on the entire substrate steel material including the weld.

Patent Document 6 discloses a surface-treated stainless steel sheet which is a stainless steel including, by mass %, C: ≤0.030%, Si: ≤2.00%, Mn: ≤2.00%, P≤0.050%, S: ≤0.0100%, N: ≤0.030%, Al: 0.010% to 0.100%, Cr: 10.00% to 25.00%, further including one or two or more of the group consisting of Ni: 0.10% to 4.00%, Cu: 0.10% to 2.00%, Mo: 0.10% to 2.00%, and V: 0.10% to 1.00%, one or two or more of the group consisting of Ti: 0.01% to 0.30% and Nb: 0.01% to 0.30%, a remainder consisting of unavoidable impurities and Fe, and having a Y value defined by a specific formula of −10.4 or less, in which an anticorrosive plated layer including Zn: 0.8% to 10.0% and a remainder consisting of Sn and unavoidable impurities is included.

However, these techniques in the related art have the following problems.

In order to obtain good corrosion resistance, it is necessary to have a uniform plating appearance and a plating thickness of a certain thickness or more. For this purpose, a coating treatment by a hot-dip plating method is suitable. However, in a case of plating steel containing Cr, Si, Mn, and the like, there is concern that the plating properties are hindered by a certain kind of oxide film formed on the surface. The above-described techniques in the related art lack a study to overcome the problems. Therefore, unlike a small test piece, in a case of performing hot-dip plating while continuously passing an actual wide steel strip, in the plating methods disclosed in Patent Documents 2 to 6, the element distribution state on the surface of the steel sheet is not sufficiently created, and the examination of the formation of an alloy layer at the interface for obtaining good plating properties is insufficient, so that there is concern that the surface properties and the formation of the alloy layer may vary in the manufacturing of a wide steel sheet during industrial production and partial non-plating may occur. When non-plating occurs, not only the external appearance of a product is impaired, but also a reduction in corrosion resistance and a reduction in workability are incurred.

PRIOR ART DOCUMENT

[Patent Document 1] Japanese Unexamined Patent Application, First Publication No. S61-91390
[Patent Document 2] Japanese Unexamined Patent Application, First Publication No. H8-269735
[Patent Document 3] Japanese Unexamined Patent Application, First Publication No. 2001-355051
[Patent Document 4] Japanese Unexamined Patent Application, First Publication No. 2002-38250
[Patent Document 5] Japanese Unexamined Patent Application, First Publication No. 2003-277992
[Patent Document 6] Japanese Unexamined Patent Application, First Publication No. 2009-68102

DISCLOSURE OF THE INVENTION

Problems to be Solved by the Invention

The present invention has been made in view of such problems, and an object thereof is to provide a hot-dip Sn—Zn-based alloy-plated steel sheet having a good plating appearance, and high corrosion resistance and excellent workability suitable for the vehicle field, particularly fuel tank applications, and a method of manufacturing the same.

Means for Solving the Problem

In order to solve the above-mentioned problems, the present inventors have intensively examined the composition of a steel sheet to be used, the element distribution state at the surface of the steel sheet that affects the plating appearance, and a method of forming a Sn—Zn plating and an alloy layer at the interface, and examined in detail the conditions for obtaining a good plating appearance, corrosion resistance, and workability.

As a result, it was found that by
(A) causing a steel sheet to contain a predetermined amount of Cr, and further contain P in a steel sheet composition in a predetermined amount,
(B) causing a Cr concentration, a Si concentration, and a Mn concentration at the surface of the steel sheet before plating to be certain amounts,
(C) forming an alloy layer of a specific diffusion coating layer on the steel sheet with a high coverage, and
(D) further applying a Sn—Zn-based alloy-plated layer onto the diffusion alloy layer,
the corrosion rate of the steel sheet is reduced and an anticorrosive effect by the formation of the plating and the alloy layer is exhibited. In addition, as a manufacturing method for realizing this, a method, which is capable of manufacturing a good hot-dip Sn—Zn-based alloy-plated steel sheet by setting pickling conditions and hot-dip plating conditions to special conditions so that an interface diffusion alloy layer in which the Cr concentration, the Si concentration, and the Mn concentration at the surface of the steel sheet are set to be certain amounts and which has a specific composition is formed, was found.

The present invention has been completed based on these findings, and the gist of the invention is as follows.

(1) A hot-dip Sn—Zn-based alloy-plated steel sheet according to an aspect of the present invention is a hot-dip Sn—Zn-based alloy-plated steel sheet including: a steel sheet; a diffusion alloy layer provided on one surface or both surfaces of the steel sheet; and a Sn—Zn-plated layer provided on the diffusion alloy layer, in which the steel sheet contains, by mass %, C: 0.0005% to 0.030%, Si: 0.8% or less, Mn: 0.10% to 2.0%, S: 0.010% or less, P: 0.005% to 0.040%, Cr: 4.0% to 18.0%, Ti: 0% to 0.30%, Nb: 0% to 0.040%, B: 0% to 0.0030%, Al: 0% to 0.30%, N: 0% to 0.03%, Cu: 0% to 2.0%, Ni: 0% to 3.0%, Mo: 0% to 2.0%, V: 0% to 2.0%, and a remainder consisting of Fe and impurities, the diffusion alloy layer contains Fe, Sn, Zn, Cr, and Ni, an area ratio of a Sn—Fe—Cr—Zn phase to a Sn—Fe—Ni—Zn phase in the diffusion alloy layer is 0.01 or more and less than 2.5, the diffusion alloy layer has a coverage of 98% or more with respect to the one surface of the steel sheet, the Sn—Zn-plated layer contains 1% to 20% of Zn by mass % and a remainder consisting of Sn and impurities, and an adhesion amount of the Sn—Zn-plated layer is 10 to 80 g/m$^2$ per one surface.

(2) In the hot-dip Sn—Zn-based alloy-plated steel sheet according to (1), the steel sheet may contain, by mass %, one or two or more of the group consisting of Ti: 0.010% to 0.30%, Nb: 0.001% to 0.040%, B: 0.0002% to 0.0030%, Al: 0.01% to 0.30%, and N: 0.0010% to 0.03%.

(3) In the hot-dip Sn—Zn-based alloy-plated steel sheet according to (1) or (2), the steel sheet may contain, by mass %, one or two or more of the group consisting of Cu: 0.01% to 2.0%, Ni: 0.01% to 3.0%, Mo: 0.01% to 2.0%, and V: 0.01% to 2.0%.

(4) In the hot-dip Sn—Zn-based alloy-plated steel sheet according to any one of (1) to (3), the hot-dip Sn—Zn-based alloy-plated steel sheet may have a chemical conversion film having a thickness of 0.02 to 2.0 µm on at least one surface thereof.

(5) In the hot-dip Sn—Zn-based alloy-plated steel sheet according to any one of (1) to (4), the hot-dip Sn—Zn-based alloy-plated steel sheet may have a coating film having a thickness of 10 to 300 µm on at least one surface thereof.

(6) In the hot-dip Sn—Zn-based alloy-plated steel sheet according to any one of (1) to (5), the steel sheet may contain, by mass %, Cr: 10.5% to 18.0%.

(7) In the hot-dip Sn—Zn-based alloy-plated steel sheet according to any one of (1) to (5), the steel sheet may contain, by mass %, Cr: 4.0% or more and less than 10.5%, Cu: 0.01% to 2.0%, and Ni: 0.01% to 3.0%, and the area ratio of the Sn—Fe—Cr—Zn phase to the Sn—Fe—Ni—Zn phase on the one surface or both surfaces of the diffusion alloy layer is 0.01 to 2.0.

(8) A method of manufacturing a hot-dip Sn—Zn-based alloy-plated steel sheet according to another aspect of the present invention is a method of manufacturing the hot-dip Sn—Zn-based alloy-plated steel sheet according to any one of (1) to (7), the method including: pickling, in which a steel sheet having a composition according to any one of (1) to (3), (6), and (7) is electrolytic pickled to obtain a pickled steel sheet; pre-plating, in which a Ni plating, a Ni—Fe plating, or an Fe—Ni plating is formed on at least one surface of the pickled steel sheet to obtain a pre-plated steel sheet; and plating, in which a Sn—Zn-based hot-dip plating treatment is performed on the pre-plated steel sheet to obtain a hot-dip Sn—Zn-plated steel sheet, in which, in the pickling, the steel sheet is electrolytic pickled such that an oxide film formed at a surface of the pickled steel sheet has a composition of Cr: 5.5 mass % or less, Si: 0.20 mass % or less, and Mn: 0.60 mass % or less, in terms of concentration, in a range from the surface of the steel sheet to a depth of 50 nm.

(9) In the method of manufacturing the hot-dip Sn—Zn-based alloy-plated steel sheet according to (8), in the pickling, a pickling solution may be aqueous solution of sulfuric acid which contains one or both of nitrate and sulfate having a total concentration of 50 to 200 g/l and one or both of fluorosilicate and fluoroborate having a total concentration of 5 to 100 g/l and in which a sulfuric acid concentration is 50 to 300 g/l, the steel sheet may be electrolytic pickled in the pickling solution in which a temperature of the pickling solution of 40° C. to 90° C., a current density is 1 to 100 A/dm$^2$, and an electrolysis time is 1 to 60 seconds, and after the electrolytic pickling, a residual deposit on the steel sheet may be removed, and the steel sheet may be further washed with water and dried.

(10) In the method of manufacturing the hot-dip Sn—Zn-based alloy-plated steel sheet according to (8) or (9), an adhesion amount of the Ni plating, the Ni—Fe plating, or the Fe—Ni plating formed in the pre-plating may be set to 0.1 to 3.0 g/m$^2$ per one surface of the steel sheet.

Effects of the Invention

According to the present invention, it is possible to provide a hot-dip Sn—Zn-based alloy-plated steel sheet having a good plating appearance as a product, and high corrosion resistance and excellent workability suitable for the vehicle field, particularly fuel tank applications, and a method of manufacturing the same. Furthermore, it becomes possible to stably supply the steel sheet of the present embodiment by the manufacturing method disclosed in the present invention.

EMBODIMENTS OF THE INVENTION

Figure 1:
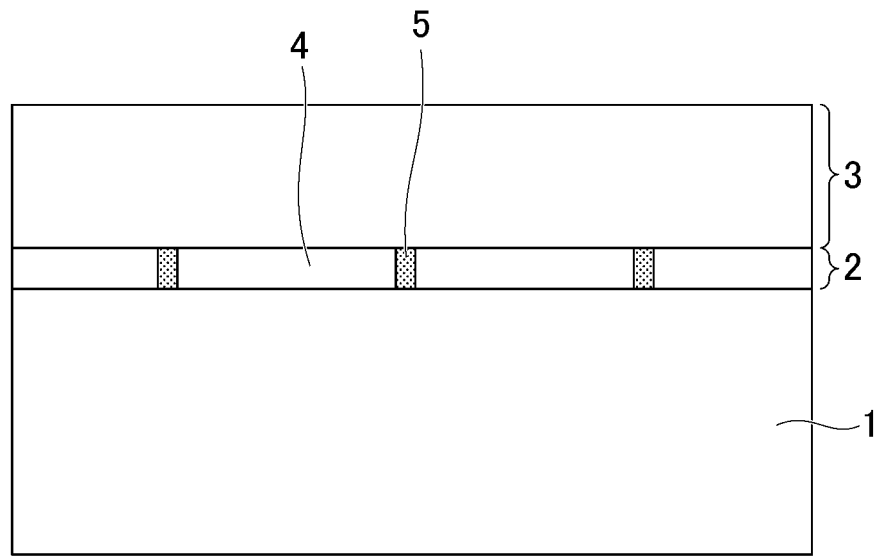
FIG. 1 is a schematic view illustrating a cross-sectional structure of a hot-dip Sn—Zn-plated steel sheet according to the present embodiment.

Hereinafter, embodiments of the present invention will be described in detail.

The present inventors examined in detail the composition of a steel sheet that is to become a base metal of a hot-dip Sn—Zn-plated steel sheet, a surface state of the steel sheet that affects the plating appearance, and a method of forming a Sn—Zn-based plating and an alloy layer. Then, the present inventors found optimum conditions for obtaining a good plating appearance, good corrosion resistance, and workability, and reached the present invention. The contents will be described below.

A hot-dip Sn—Zn-based alloy-plated steel sheet of the present embodiment includes: a steel sheet; a diffusion alloy layer provided on one surface or both surfaces of the steel sheet; and a Sn—Zn-plated layer which is provided on the diffusion alloy layer and contains 1% to 20% of Zn by mass % and a remainder consisting of Sn and impurities.

The steel sheet contains, as a chemical composition, by mass %, C: 0.0005% to 0.030%, Si: 0.8% or less, Mn: 0.10% to 2.0%, S: 0.010% or less, P: 0.005% to 0.040%, Cr: 4.0% to 18.0%, and a remainder consisting of Fe and impurities. The steel sheet may further contain optional elements within a predetermined range.

The diffusion alloy layer has a Sn—Fe—Cr—Zn phase and a Sn—Fe—Ni—Zn phase, where the area ratio of the Sn—Fe—Cr—Zn phase to the Sn—Fe—Ni—Zn phase (Sn—Fe—Cr—Zn phase/Sn—Fe—Ni—Zn phase) is 0.01 or more and less than 2.5, has a coverage of 98% or more with respect to one surface, and contains Fe, Sn, Zn, Cr, and Ni.

The adhesion amount of the Sn—Zn-plated layer is 10 to 80 g/m$^2$ per one surface.

The diffusion alloy layer and the Sn—Zn-plated layer may be provided on only one surface or both surfaces of the steel sheet.

<Chemical Composition of Steel Sheet>

First, the reason for limiting the numerical values of the chemical composition in the steel sheet that is the base metal of the hot-dip Sn—Zn-plated steel sheet according to the present embodiment will be described. In the following description, % in the concentration unit of the chemical composition represents mass %.

C: 0.0005% to 0.030%

C is an element that acts on the strength of a steel sheet, but reduces the ductility of the steel sheet and impairs press formability and the like. Therefore, the amount of C is preferably as small as possible. In addition, in the steel containing Cr, C is an element that causes intergranular corrosion in a weld and a brazed portion. Therefore, it is necessary to limit C to a certain content or less. Therefore, the upper limit of the C content is set to 0.030%. The upper limit of the C content is more preferably 0.020%, 0.010%, or 0.008%. In a case where the C content is less than 0.0005%, it becomes difficult to secure the strength and the cost at the time of smelting increases. Therefore, the lower limit of the C content is set to 0.0005%. The lower limit of the C content is more preferably 0.0008%, 0.0010%, or 0.0020%.

Si: 0.8% or Less

Si acts as a solid solution strengthening element on the strength of the steel sheet. On the other hand, Si reduces the ductility of the steel sheet and adversely affects the hot-dip plating properties. Therefore, it is necessary to limit Si to a certain value or less. Therefore, the upper limit of the Si content is set to 0.8%. The upper limit of the Si content is preferably 0.6%, 0.5%, or 0.4%. The lower limit of the Si content is not particularly specified and may be 0%. Considering refining costs, the lower limit of the Si content may be set to 0.01%, 0.05%, or 0.10%.

Mn: 0.10% to 2.0%

Mn, like Si, acts on the strength of the steel sheet by solid solution strengthening, but reduces the ductility of the steel sheet and adversely affects hot-dip plating. Therefore, it is necessary to limit Mn to a certain value or less. In a case where the Mn content is less than 0.10%, the effect of including Mn is not obtained. On the other hand, when the Mn content exceeds 2.0%, the press formability is impaired, and a Mn oxide is generated at the surface of the steel sheet, so that the plating properties are impaired. Therefore, the Mn content is set to 0.10% to 2.0%. The upper limit of the Mn content is preferably 1.5%, 1.0%, or 0.8%. The lower limit of the Mn content is preferably 0.15%, 0.2%, or 0.4%.

P: 0.005% to 0.040%

P acts as a solid solution strengthening element on the strength of the steel sheet. Furthermore, P is an element effective in improving the corrosion resistance in some salt damage environments. On the other hand, P is an element that reduces ductility and also an element that segregates at grain boundaries and deteriorates secondary workability. Therefore, the upper limit of the P content is set to 0.040%. The upper limit of the P content is preferably 0.030%, 0.025%, or 0.020%. When the P content is less than 0.005%, the effect of improving strength and improving corrosion resistance is poor. Therefore, the lower limit of the P content is set to 0.005%. The lower limit of the P content is preferably 0.010%, 0.015%, or 0.018%.

S: 0.010% or Less

S is an impurity mixed during the refining of steel, and is bonded to Mn and Ti to form precipitates, which deteriorate the workability. Therefore, the S content is limited to 0.010% or less. The upper limit of the S content may be set to 0.008%, 0.006%, or 0.004%. Since the base steel sheet of the Sn—Zn-based alloy-plated steel sheet according to the present embodiment does not need to contain S, the lower limit of the S content is 0%. However, since the manufacturing cost increases to reduce the S content to less than 0.0005%, the S content is preferably set to 0.0005% or more. The lower limit of the S content is more preferably 0.0007%, 0.0008%, or 0.001%.

Cr: 4.0% to 18.0%

Cr is an important component that secures the corrosion resistance of the steel sheet. The higher the Cr content, the more effective the corrosion resistance is. Therefore, the lower limit of the Cr content is set to 4.0%. When the Cr content is less than 4.0%, particularly at a weld portion or a cut end surface portion, there is concern that sufficient salt damage corrosion resistance may not be obtained even if the hot-dip Sn—Zn-based alloy plating according to the present embodiment is applied thereon. The lower limit of the Cr content may be set to 5.0%, 6.0%, 7.0%, 8.0%, 10.5%, or 12.0%.

On the other hand, since Cr reduces the ductility of the steel sheet, it is necessary to limit Cr to a certain value or less. Specifically, when the Cr content exceeds 18.0%, cold workability such as press formability is reduced and the material cost is increased. Therefore, the Cr content is set to 18.0% or less. In addition, in a case where it is necessary to secure higher cold workability in press forming having a complex shape such as a saddle type tank, the upper limit of the Cr content is preferably set to less than 10.5%. The upper limit of the Cr content may be set to 15.0%, 13.0%, 11.0%, 10.0%, 9.0%, or 8.0%.

In the Sn—Zn-based alloy-plated steel sheet according to the present embodiment, the steel sheet may further include, as the composition, one or two or more of the group consisting of Ti: 0.010% to 0.30%, Nb: 0.001% to 0.040%, B: 0.0002% to 0.0030%, Al: 0.01% to 0.30%, and N: 0.0010% to 0.03%. However, even if the steel sheet does not contain these elements, the hot-dip Sn—Zn-based alloy-plated steel sheet according to the present embodiment can solve the problems, and therefore the lower limits of these elements are 0%.

Ti: 0% to 0.30%

Ti has a strong affinity with C and N, forms carbonitrides, and suppresses intergranular corrosion. Furthermore, Ti has an effect of reducing C and N which are solid-solubilized in the steel and thus enhances the workability of the steel sheet. This effect is obtained in a case where the Ti content is 0.010% or more. On the other hand, when the Ti content exceeds 0.30%, the ductility of the steel sheet is reduced and the strength and toughness of the weld are reduced. Therefore, the upper limit of the Ti content is set to 0.30%.

Nb: 0% to 0.040%

Nb, Like Ti, has a strong affinity with C and N, forms carbonitrides, and suppresses intergranular corrosion. Furthermore, Nb has an effect of reducing C and N which are solid-solubilized in the steel and thus enhances the workability of the steel sheet. This effect is obtained when the Nb content is 0.001% or more. On the other hand, when the Nb content exceeds 0.040%, the ductility of the steel sheet is reduced and the strength and toughness of the weld are reduced. Therefore, the upper limit of the Nb content is set to 0.040%.

B: 0% to 0.0030%

B is an element that increases grain boundary strength and improves the secondary workability by segregating at the grain boundaries. In a case where the B content is 0.0002% or more, the effect is obtained, so that the lower limit of the B content may be set to 0.0002%. More preferably, the lower limit of the B content is 0.0003%. On the other hand, when the B content exceeds 0.0030%, the ductility of the steel sheet decreases and the strength and toughness of the weld also decrease. Furthermore, in a case where B is excessive, the corrosion resistance decreases due to the formation of boride. Therefore, the upper limit of the B content is set to 0.0030%. The upper limit of the B content is more preferably 0.0020%.

Al: 0% to 0.30%

Al is an element used as a deoxidizing agent during refining of steel. In a case where the Al content is 0.01% or more, a deoxidizing effect is obtained. However, when the Al content exceeds 0.30%, a reduction in the toughness of the weld and a reduction in the workability are incurred. Therefore, the upper limit of the Al content is set to 0.30%.

N: 0% to 0.03%

N is an impurity element mixed during refining of steel. In addition, since N forms nitrides of Ti, Al, and Nb, it is necessary to limit the amount of N to a certain amount or less in order to avoid an effect on the workability. Therefore, it is necessary to limit the N content to 0.03% or less. On the other hand, in order to reduce the N content to less than 0.0010%, the manufacturing cost increases. Therefore, the lower limit of the N content may be set to 0.0010%.

The steel sheet which is to be the base metal of the Sn—Zn-based alloy-plated steel sheet according to the present embodiment contains at least one or more of Cu: 0.01% to 2.0%, Ni: 0.01% to 3.0%, Mo: 0.01% to 2.0%, and V: 0.01% to 2.0%, thereby obtaining more preferable corrosion resistance. However, even if the steel sheet does not contain these elements, the hot-dip Sn—Zn-based alloy-plated steel sheet according to the present embodiment can solve the problems, and therefore the lower limits of these elements are 0%.

Cu: 0% to 2.0%

Cu is an element effective in increasing the corrosion resistance of the steel sheet. Since the effect is exhibited when the Cu content is 0.01% or more, the lower limit of the Cu content may beset to 0.01%. The lower limit of the Cu content is more preferably 0.03%. When the Cu content is too high, the embrittlement during hot rolling is adversely affected. Therefore, the upper limit of the Cu content is set to 2.0% or less. The upper limit of the Cu content is more preferably 1.5%.

Ni: 0% to 3.0%

Ni is an element effective in increasing the corrosion resistance of the steel sheet. Since the effect is exhibited when the Ni content is 0.01% or more, the lower limit of the Ni content may be set to 0.01%. The lower limit of the Ni content is more preferably 0.03%. When the Ni content is too high, the ductility and the toughness of welding are adversely affected. Therefore, the upper limit of the Ni content is set to 3.0%. The upper limit of the Ni content is more preferably 2.0%.

Mo: 0% to 2.0%

Mo is an element effective in increasing the corrosion resistance of the steel sheet. Since the effect is exhibited when the Mo content is 0.01% or more, the lower limit of the Mo content may be set to 0.01%. When the Mo content is too high, the ductility decreases, so that the upper limit of the Mo content is set to 2.0% or less.

V: 0% to 2.0%

V, like Mo, is an element effective in increasing the corrosion resistance of the steel sheet. Since the effect is exhibited when the V content is 0.01% or more, the lower limit of the V content may be set to 0.01%. When the V content is too high, the ductility is adversely affected. Therefore, the upper limit of the V content is set to 2.0%.

In the chemical composition of the steel sheet included in the hot-dip Sn—Zn-based alloy-plated steel sheet of the present embodiment, the remainder excluding the above elements contains Fe and impurities. Impurities are elements that are incorporated from steel raw materials and/or in a steelmaking process, and are elements that are allowed within the range that does not impair the characteristics of the hot-dip Sn—Zn-based alloy-plated steel sheet of the present embodiment.

<Diffusion Alloy Layer>

Next, the diffusion alloy layer will be described.

The present inventors conducted various examinations on the effect of the surface state of the steel sheet and the diffusion alloy layer on the plating appearance. As a result, it was found that regarding the steel sheet having the above composition, by causing the surface state thereof to be a specific state before the formation of a plated layer, that is, by causing the Cr concentration, the Si concentration, and the Mn concentration at the surface of the steel sheet before the formation of a plated layer to be certain values or les, and by forming a diffusion alloy layer having a specific composition during hot-dip Sn—Zn-based plating, a good plating appearance, high corrosion resistance, and excellent workability can be obtained. Furthermore, by combining the above with a surface treatment method, which will be described later, the corrosion resistance is further improved. The diffusion alloy layer here means an alloy layer formed between the steel sheet and a plated layer described later due to metal diffusion.

The diffusion alloy layer formed between the steel sheet and the Sn—Zn-plated layer has a phase primarily containing Sn—Fe—Cr—Zn and a phase primarily containing Sn—Fe—Ni—Zn. Hereinafter, there are cases where the phase primarily containing Sn—Fe—Cr—Zn is referred to as an A phase, and the phase primarily containing Sn—Fe—Ni—Zn is referred to as a B phase.

The ratio of the A phase to the B phase (A phase/B phase) in the diffusion alloy layer is in a range of 0.01 or more and less than 2.5 on the surface of the steel sheet by area ratio. In a case where the A phase/B phase is 2.5 or more, repelling of hot-dip plating occurs during plating, and the external appearance of the plated layer cannot be secured. The A phase/B phase is more preferably 2.0 or less, 1.0 or less, and even more preferably 0.2 or less.

In a case where the A phase/B phase is less than 0.01, there may be no continuity between the steel sheet and the plated layer, or a phase different from the phase containing Sn—Fe—Cr—Zn (A phase), such as a Cr oxide phase may be formed. In such a case, a sufficient plating appearance cannot be secured. The A phase/B phase is more preferably 0.05 or more, 0.08 or more, or 0.1 or more.

The Sn—Fe—Cr—Zn phase (A phase) means a phase primarily containing Sn, Fe, Cr, and Zn, and a phase having these four elements in an amount of 90% or more. In addition to these elements, for example, Ni and other elements may be contained. Similarly, the Sn—Fe—Ni—Zn phase (B phase) also means a phase primarily containing Sn, Fe, Ni, and Zn, and a phase having these four elements in an amount of 90% or more. In addition to these elements, for example, Cr and other elements may be contained. In addition, in a case where a certain region corresponds to both the definition of the A phase and the definition of the B phase, one having a Cr content larger than a Ni content is determined as the A phase, and one having a Ni content larger than a Cr content is determined as the B phase.

The proportion of the diffusion alloy layer covering at least one surface of the steel sheet is preferably 98% or more. Preferably, the coverage of the diffusion alloy layer on both surfaces of the steel sheet is 98% or more. When the coverage is less than 98%, the region which is not covered by the diffusion alloy layer increases, the wettability of the plating in that area is insufficient, and a good plating appearance cannot be secured as a whole.

The diffusion alloy layer is an alloy layer containing Fe, Sn, Zn, Cr, and Ni. These elements have been diffused from the steel sheet, a pre-plated layer, and a hot-dip Sn—Zn alloy-plated layer when the diffusion alloy layer is formed between the steel sheet and the Sn—Zn-plated layer. In addition to these elements, the diffusion alloy layer may contain a small amount of elements within a range that does not adversely affect the characteristics.

The thickness of the diffusion alloy layer is not particularly limited. For example, the lower limit of the average thickness of the diffusion alloy layer may be set to 0.1 μm or 0.3 μm. The upper limit of the average thickness of the diffusion alloy layer may be set to 3.0 μm or 2.0 μm. By setting the average thickness of the diffusion alloy layer to 0.1 μm or more, the coverage of the diffusion alloy layer can be further improved and the plating appearance can be further improved. By setting the thickness of the diffusion alloy layer to 3.0 μm or less, the workability can be more preferably maintained.

The concentration analysis of the elements at the surface of the steel sheet before the plating described above is performed by quantitatively measuring the element concentrations in a depth direction from the surface by glow discharge emission spectroscopy (GDS). The concentration can be measured by measuring the integrated intensity from the surface to a depth of 50 nm and comparing the measured integrated intensity with the integrated intensity at 50 nm on the thickness middle portion side. Specifically, by using GDS, the ratio of the integral value of any intensity from the surface layer to a depth of 50 nm to the integral value of any intensity at a width of 50 nm in depth direction in a bulk is obtained, and a composition analysis value of the bulk is multiplied by the ratio, whereby the concentration of the elements at the surface of the steel sheet before plating can be measured. The measurement can be performed at three or more different places and the average value thereof can be calculated. Alternatively, one average measurement place can be selected and used as the measurement value.

The composition ratio and coverage of the diffusion alloy layer are measured by electrolytically peeling the plated layer in a NaOH solution, and then using an apparatus capable of quantitatively measuring the element concentration distribution, such as an electron probe micro analyzer (EPMA) or a computer-aided micro analyzer (CMA). The ratio of the A phase (Sn—Fe—Cr—Zn phase) to the B phase (Sn—Fe—Ni—Zn phase) can be obtained from the ratio between the areas of such phases determined from the image of the element concentration distribution. In addition, the coverage of the diffusion alloy layer can be measured by obtaining the ratio of the total areas of the A phase and the B phase with respect to the entire measurement range, because Sn is not detected in parts where the diffusion alloy layer is not formed and the parts can be clearly distinguished from the A phase and the B phase described above. In the case of measurement by EPMA, in a case where the thickness of the diffusion alloy layer is small, it may be considered that the elements of the steel sheet at a layer therebeneath may be counted together. However, the ratio of the A phase to the B phase measured in the present invention is effective as an index for securing the plating appearance, excellent corrosion resistance, and workability, and is therefore considered to be an appropriate measurement method and index. For the measurement, for example, measurement is performed at three or more different places with a measurement area of about 0.1 to 0.3 mm$^2$, and the average value thereof is calculated. Alternatively, one average measurement place can be selected and used as the measurement value.

Furthermore, the thickness of the diffusion alloy layer can be measured by observing a cross section of the Sn—Zn-based alloy-plated steel sheet with a scanning electron microscope to confirm the diffusion alloy layer and measuring the thickness. Since the diffusion alloy layer has irregularities, the thickness can be measured, for example, by measuring five thicknesses on a cross section and taking the average value thereof.

Figure 2:
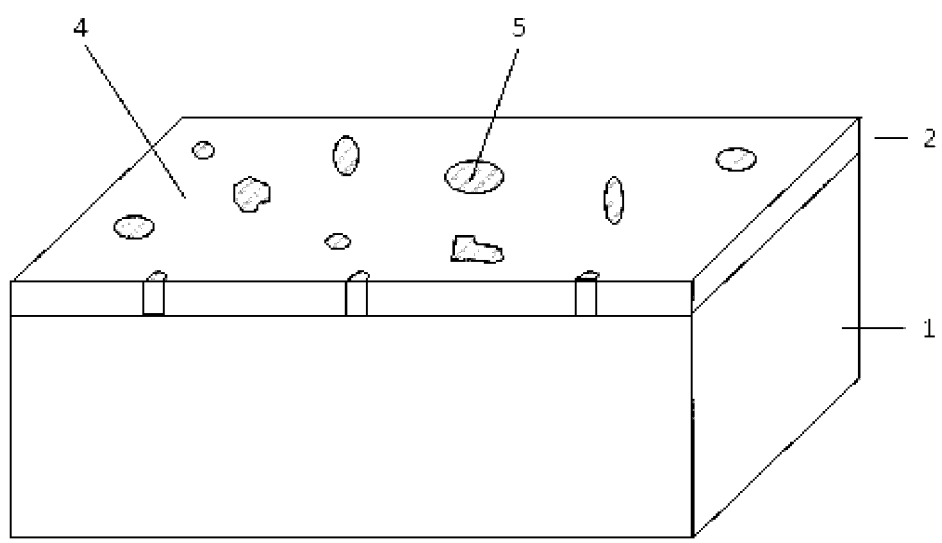
FIG. 2 is a perspective view illustrating a diffusion alloy layer of the hot-dip Sn—Zn-plated steel sheet of the present embodiment.

FIGS. 1 and 2 schematically illustrate an example of the diffusion alloy layer. As illustrated in FIG. 1, a diffusion alloy layer 2 is formed on a steel sheet 1, and a plated layer 3 is formed on the diffusion alloy layer 2. The diffusion alloy layer 2 has a Sn—Fe—Cr—Zn phase 4 and a Sn—Fe—Ni—Zn phase 5. Furthermore, as illustrated in FIG. 2, the Sn—Fe—Cr—Zn phase 4 has a substantially elliptical shape or an irregular shape in a plan view.

Figure 3:
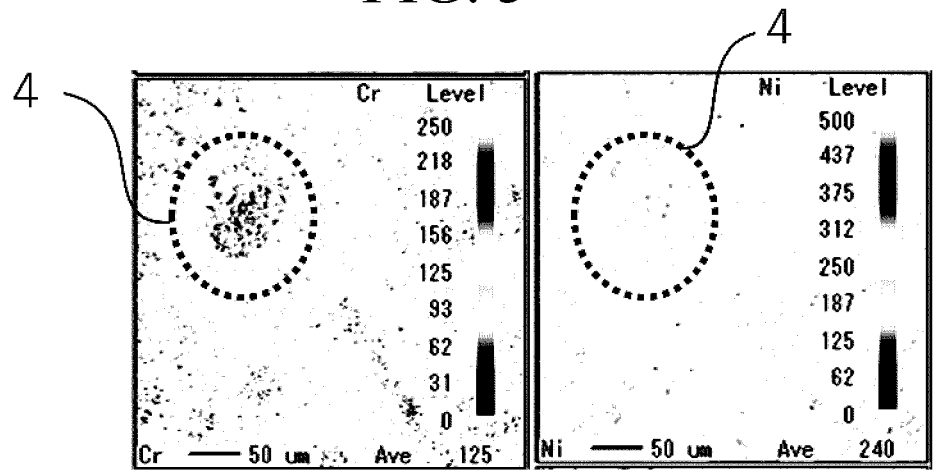
FIG. 3 is a Cr element map and a Ni element map of an example of the diffusion alloy layer of the hot-dip Sn—Zn-plated steel sheet of the present embodiment.

FIG. 3 shows a Cr element map and a Ni element map of an example of the diffusion alloy layer. The dark region surrounded by the dotted line is the Sn—Fe—Cr—Zn phase 4, and the other region is the Sn—Fe—Ni—Zn phase 5. A region primarily containing Sn, Fe, Cr, and Zn in a total amount of 90 mass % or more is determined as the A phase, and a region primarily containing Sn, Fe, Ni, and Zn in a total amount of 90 mass % or more is determined as the B phase. In a case where the Cr concentration is subjected to surface analysis by EPMA and the Cr concentration has shading, the Cr concentration contained in the A phase is about 1.5 to 2.0 times the Cr concentration contained in the B phase in many cases. Therefore, it is efficient to estimate a part where the Cr concentration is 1.5 times or more as the A phase and allow the analysis to proceed. On the other hand, in a case where the Ni concentration is subjected to surface analysis by EPMA and the Ni concentration has shading, the Ni concentration contained in the B phase is about 1.5 to 2.0 times the Ni concentration contained in the A phase in many cases. Therefore, it is efficient to estimate a part where the Ni concentration is 1.5 times or more as the B phase and allow the analysis to proceed.

<Sn-Zn-Plated Layer>

On the diffusion alloy layer, the Sn—Zn-plated layer containing 1% to 20% of Zn by mass % and a remainder consisting of Sn and impurities is provided. The lower limit of the amount of Zn in the Sn—Zn-plated layer is preferably 1.2%, 2.0%, or 3.0%. The upper limit of the amount of Zn in the Sn—Zn-plated layer is preferably 15%, 10%, or 8.8%. By setting the amount of Zn in the Sn—Zn-plated layer to be in the range of 1% to 20%, good corrosion resistance is obtained. Furthermore, when the amount of Zn in the Sn—Zn-plated layer is set to 8.8% or less, a primary phase of Sn is precipitated and Zn is finely dispersed, so that more preferable corrosion resistance can be obtained.

The adhesion amount of the Sn—Zn-plated layer is 10 to 80 g/m$^2$ per one surface, and more preferably 15 to 60 g/m$^2$. When the adhesion amount is less than 10 g/m$^2$ on one surface, good corrosion resistance cannot be secured, and when the adhesion amount exceeds 80 g/m$^2$, in addition to an increase in the cost, and the thickness may vary, resulting in pattern defects or a reduction in weldability. The lower limit of the adhesion amount of the Sn—Zn-plated layer may be set to 12 g/m$^2$, 15 g/m$^2$, or 20 g/m$^2$. The upper limit of the adhesion amount of the Sn—Zn-plated layer may be set to 70 g/m$^2$, 60 g/m$^2$, or 50 g/m$^2$. The adhesion amount of the Sn—Zn-plated layer can be measured, for example, by a fluorescent X-ray analysis method, a gravimetric method before and after plating dissolution, or the like.

The adhesion amount is evaluated for each surface of the steel sheet. Therefore, in a case where the Sn—Zn-plated layer is provided on both surfaces of the steel sheet, it is preferable to measure the adhesion amount by a fluorescent X-ray analysis method. It is determined that the hot-dip Sn—Zn-based alloy-plated steel sheet in which the adhesion amount of the Sn—Zn-plated layer on at least one surface is 10 to 80 g/m$^2$ satisfies the above requirement regarding the adhesion amount.

The hot-dip Sn—Zn-based alloy-plated steel sheet of the present embodiment can be used without coating, but can be coated depending on the purpose in order to further improve corrosion resistance, formability, and design.

In a case where the hot-dip Sn—Zn-based alloy-plated steel sheet of the present embodiment is applied to a fuel tank for a vehicle, the Sn—Zn-plated layer is damaged by welding or brazing at the time of manufacturing the fuel tank. However, by applying an anticorrosive coating to the hot-dip Sn—Zn-based alloy-plated steel sheet, higher antirust properties can be obtained. The thickness of the coating film for the anticorrosive coating can be set to, for example, 10 to 300 µm. In a case where the anticorrosive coating is a black shower coating or electrodeposition coating, the thickness of the coating film is preferably 10 to 30 µm. In addition, in order to prevent corrosion caused by coating film damage due to chipping in the lower part of the fuel tank and to further enhance antirust properties, it is possible to apply a chipping resistant coating to the hot-dip Sn—Zn-based alloy-plated steel sheet of the present embodiment. In this case, the chipping resistant coating has a coating film thickness of 100 to 300 µm. As the coating method, an electrodeposition coating method can be applied as well as a spray method and shower coating.

Furthermore, the coating film adhesion can be improved by subjecting the hot-dip Sn—Zn-based alloy-plated steel sheet of the present embodiment to a chemical conversion treatment as a base material for black coating. As the chemical conversion treatment method, known techniques such as a chromate film of trivalent chromium containing no hexavalent chromium and a chromate-free film containing no chromium can be used. The film thickness of the chemical conversion film is preferably set to 0.02 µm or more as an effective film thickness that exhibits the effect. Furthermore, the upper limit of the film thickness of the chemical conversion film is preferably set to 2.0 µm which does not impair resistance weldability.

Furthermore, in order to secure press formability during cold working such as press forming, an organic lubricating film may be formed immediately on the Sn—Zn-plated layer of the hot-dip Sn—Zn-based alloy-plated steel sheet of the present embodiment, or on the chemical conversion film. In this case, the friction coefficient value of the lubricating film is preferably 0.15 or less. The film thickness of the lubricating film is preferably 2.0 µm or less in consideration of weldability.

In addition, the surface roughness of the hot-dip Sn—Zn-plated steel sheet can be controlled to be 0.05 to 1.0 µm in terms of Ra by performing subjecting skin pass rolling on the hot-dip Sn—Zn-plated steel sheet after plating solidification or after film formation. Accordingly, good weldability can be obtained while maintaining workability. In a case where the surface roughness Ra of the hot-dip Sn—Zn-plated steel sheet is less than 0.05 µm, lack of a lubricating oil during forming occurs, resulting in a reduction in workability. On the other hand, in a case where the surface roughness Ra of the hot-dip Sn—Zn-plated steel sheet is more than 1.0 µm, metal adhesion between the steel sheet and a die increases, resulting in a reduction in workability. The surface roughness of the hot-dip Sn—Zn-plated steel sheet is more preferably 0.1 µm or more. The hot-dip Sn—Zn-based plated steel sheet is more preferably 0.5 µm or less.

Furthermore, the surface of the Sn—Zn-plated layer of the hot-dip Sn—Zn-based alloy-plated steel sheet or the surface of the film can be coated with a known antirust oil or lubricating oil in order to improve antirust properties and formability.

<Manufacturing Method>

Next, a method of manufacturing the hot-dip Sn—Zn-based alloy-plated steel sheet of the present embodiment will be described.

The method of manufacturing the hot-dip Sn—Zn-based alloy-plated steel sheet according to the present embodiment includes: pickling, in which a steel sheet having the above chemical composition is electrolytic pickled to obtain a pickled steel sheet; pre-plating, in which a Ni plating, a Ni—Fe plating, or an Fe—Ni plating is formed on at least one surface of the pickled steel sheet to obtain a pre-plated steel sheet; and plating, in which a Sn—Zn-based hot-dip plating treatment is performed on the pre-plated steel sheet to obtain a hot-dip Sn—Zn-plated steel sheet.

In the manufacturing method of the present embodiment, it is preferable that in the pickling, the steel sheet is electrolytic pickled such that an oxide film formed at a surface of the pickled steel sheet has a composition of Cr: 5.5 mass % or less, Si: 0.20 mass % or less, and Mn: 0.60 mass % or less, in terms of concentration, in a range from the surface of the steel sheet to a depth of 50 nm.

Hereinafter, details of each processes will be described.

As the steel sheet having the above chemical composition, for example, a steel sheet manufactured as follows can be used. First, a slab having the above chemical composition is cast, and the slab is hot-rolled to obtain a hot-rolled sheet. The hot-rolled sheet may be annealed. Then, the hot-rolled sheet is subjected to hot-rolled steel sheet pickling and then cold-rolled to obtain a cold-rolled steel sheet having a predetermined thickness. In order to prevent cracking and the like of the steel sheet during cold rolling, intermediate annealing may be performed during cold rolling. Furthermore, the obtained cold-rolled steel sheet may be annealed. In this manner, the steel sheet to be used in the manufacturing method of the present embodiment is prepared.

<Pickling>

In the pickling, by performing electrolytic pickling on the annealed steel sheet under conditions described later, the concentrations (mass %) of elements in the range from the surface of the steel sheet to 50 nm (this corresponds to the oxide film at the surface of the steel sheet) are controlled to achieve Cr: 5.5% or less, Si: 0.20% or less, and Mn: 0.60% or less.

In order to prepare a material that can satisfy the workability of the steel sheet, a heat treatment is usually performed in annealing after cold rolling. However, in the annealing, oxides of various elements contained in the steel sheet, particularly Cr, Si, and Mn grow thick at the surface and form oxide films. When hot-dip Sn—Zn-based plating is performed, oxide films induces repelling of the plated metal and become an inhibitory factor that hinders the formation of the diffusion alloy layer.

That is, when hot-dip Sn—Zn plating is performed on a steel sheet having oxides of Cr, Si, and Mn concentrated at the surface of the steel sheet, repelling of plating occurs in a part where the oxides of Cr, Si, and Mn are present, and a part like a depression, at which most of the plating is pushed to the vicinity, is generated. This causes a poor plating appearance and induces a reduction in corrosion resistance and workability.

In order to solve this problem, the present inventors found that by using a steel sheet in which oxide films of Cr, Si, and Mn at the surface of the steel sheet before a plating treatment contain, in terms of concentration (mass %), Cr: 5.5% or less, Si: 0.20% or less, and Mn: 0.60% or less in a range from the surface of the steel sheet to 50 nm and providing a diffusion alloy layer containing Ni, Sn, Cr, Fe, and Zn where the ratio of a Sn—Fe—Cr—Zn phase (A phase) to a Sn—Fe—Ni—Zn phase (B phase) is 0.01 to less than 2.5 between a Sn—Zn-plated layer and the steel sheet, good plating appearance is obtained.

The surface state of the steel sheet before the plating treatment can be obtained by analysis in the depth direction from the surface of the steel sheet by GDS. The total amount of all the elements detected by GDS is set to 100 mass %, and the concentrations of Cr, Si, and Mn may be calculated based on this value. In addition, it is possible to specify a partial element concentration by using both the analysis of an element distribution state by EPMA or CMA on the surface and the GDS analysis.

During annealing after hot rolling or after cold rolling, Cr, Si, and Mn solid-solubilized in steel are oxidized to form oxide films. In order to obtain a Sn—Zn-plated layer having a good plating appearance, it is important to remove the oxide films formed by the annealing after cold rolling which is pre-plating. That is, by performing cold rolling on the hot-rolled steel sheet to obtain a cold-rolled steel sheet having a predetermined thickness, annealing the cold-rolled steel sheet at a temperature of a recrystallization temperature or higher, and then performing electrolytic pickling under specific conditions, the surface state of Cr, Si, Mn oxides can be controlled as described above.

The control of the surface state of Cr, Si, and Mn oxides at the surface of the steel sheet can be achieved, for example, by performing electrolytic pickling in an aqueous solution of sulfuric acid containing one or both of nitrate and sulfate and one or both of fluorosilicate and fluoroborate using the annealed steel sheet as an anode. By electrolyzing the steel sheet as the anode, the oxide films can be uniformly dissolved without a residual portion, and a surface state of the steel sheet that enables the formation of a target diffusion alloy layer is achieved. Therefore, it is important to remove the residual deposits generated by the dissolving with a brush or a spray, and then performing washing with water and drying to adjust the surface state of the steel sheet.

The sulfuric acid used as the main agent in the pickling solution has a concentration of 50 g/l to 300 g/l. When the sulfuric acid concentration is less than 50 g/l, pickling efficiency is poor, and when the sulfuric acid concentration exceeds 300 g/l, overpickling is incurred, which adversely affects the plating properties.

As nitrate, sodium nitrate, potassium nitrate, ammonium nitrate, or the like can be used, and the concentration thereof is set to 50 to 200 g/l. When the concentration thereof is less than 50 g/l, the effect is not obtained, while the concentration thereof exceeds 200 g/l, the effect is saturated.

As sulfate, sodium sulfate or the like can be used, and the concentration thereof is 50 to 200 g/l. When the concentration thereof is less than 50 g/l, the effect is not obtained, while the concentration thereof exceeds 200 g/l, the effect is saturated.

In a case where both nitrate and sulfate are used, the total concentration of nitrate and sulfate is set to 50 and 200 g/l.

Furthermore, as fluorosilicate and fluoroborate, fluorosilicate such as sodium fluorosilicate and potassium fluorosilicate, and fluoroborate such as sodium fluoroborate and ammonium fluoroborate can be used. Any one or more of fluorosilicate and fluoroborate may be added in a total amount of 5 to 100 g/l. When the addition amount of any one or more of fluorosilicate and fluoroborate is less than 5 g/l, there is no contribution to the improvement of moderate removal of the oxide films, and when the addition amount exceeds 100 g/l, the effect is saturated. The addition amount of any one or more of fluorosilicate and fluoroborate is preferably 10 g/l or more.

The electrolytic pickling conditions include, for example, a pickling solution temperature in a range of 40° C. to 90° C., and more preferably 50° C. to 80° C., a current density per steel sheet area in a range of 1 to 100 A/dm$^2$, and more preferably 5 to 80 A/dm$^2$, and an electrolysis time in a range of 1 to 60 seconds, and more preferably 1 to 30 seconds. When the electrolytic pickling conditions deviate from these ranges, the surface state of Cr, Si, and Mn oxides at the surface of the steel sheet cannot be appropriately controlled.
<Pre-Plating>

Next, the pre-plating will be described.

The diffusion alloy layer having the Sn—Fe—Cr—Zn phase (A phase) and the Sn—Fe—Ni—Zn phase (B phase) between the steel sheet and the Sn—Zn-plated layer can be obtained by applying a metal coating (pre-plated layer) primarily containing a Ni plating, a Ni—Fe plating, or an Fe—Ni plating to the steel sheet (pickled steel sheet) in which Cr, Si, and Mn oxide films at the surface of the steel sheet have concentrations of, by mass %, Cr: 5.5% or less, Si: 0.20% or less, and Mn: 0.60% or less at the surface from the surface to 50 nm, and thereafter immersing the resultant at a steel sheet temperature of 50° C. or higher before the immersion in a Sn—Zn plating bath having a bath temperature of 260° C. or higher.

In a case where the Sn—Zn-plated layer is formed by a flux method, the temperature of the flux applied to the steel sheet before the steel sheet is immersed in the Sn—Zn plating bath is adjusted to adjust the temperature of the steel sheet before being immersed into the plating bath. In a case where the Sn—Zn-plated layer is formed by Sendzimir type hot-dip plating, the temperature condition in the snout is adjusted to control the temperature of the steel sheet before being immersed in the plating bath.

The metal coating primarily containing Ni (that is, Ni plating) is based on a Watts bath primarily containing Ni sulfate, Ni chloride, and boric acid, and is formed after the pH is adjusted with sulfuric acid. In addition, a Ni—Fe-based metal coating (Ni—Fe plating) is similarly formed by adding ferrous iron to the above composition. The proportion of Fe in the Ni—Fe plating is preferably set to 10 to less than 50 mass %. At this time, it is important to adjust the pH of the electrolytic bath to 2.5 or less. When the pH is more than 2.5, the etching power on the surface of the steel sheet is reduced, and oxides or hydroxides are formed at the interface, which may cause a problem in plating adhesion. For the Ni plating or Ni—Fe plating, the adhesion amount of metal per one surface is preferably set to 0.1 to 3.0 g/m$^2$. When the adhesion amount is less than 0.1 g/m$^2$, the coatability is not sufficient, so that the alloy layer is not sufficiently formed, and the effect of suppressing repelling of the plating is small. On the other hand, when the Ni plating or Ni—Fe plating is applied in excess of 3.0 g/m$^2$, the effect of suppressing repelling of the plating is saturated and a thick alloy layer is formed at the interface between the plated layer and the steel sheet, resulting in a reduction in the plating adhesion during the formation of a Sn—Zn-based alloy-plated steel sheet.

Application of an Fe—Ni-based metal coating (Fe—Ni plating) primarily containing Fe before the Sn—Zn plating promotes the formation of the Sn—Fe—Cr—Zn phase (A phase) and the Sn—Fe—Ni—Zn phase (B phase), further improves the external appearance of the Sn—Zn-plated layer, and causes refinement of a primary phase of Sn and the improvement in corrosion resistance, which is preferable. The adhesion amount of the Fe—Ni plating is set to 0.2 g/m$^2$ or more in order to obtain the above-described alloy layer of the Sn—Fe—Cr—Zn phase (A phase) and the Sn—Fe—Ni—Zn phase (B phase). The proportion of Ni in the Fe—Ni plating is preferably set to 10 to 50 mass % from the viewpoint of refining the primary phase of Sn. The upper limit of the adhesion amount of the Fe—Ni plating is set to 3.0 g/m$^2$ or less, as in the case of the Ni plating or Ni—Fe plating, because the effect of suppressing repelling is saturated.
<Plating>

The steel sheet (pre-plated steel sheet) on which the above metal coating is formed is subjected to a Sn—Zn-based hot-dip plating treatment to form the Sn—Zn-plated layer. The Sn—Zn-plated layer is formed by a hot-dip plating method. For forming the Sn—Zn-plated layer, either of the flux method and the Sendzimir method can be suitably used.

In the flux method, hot-dip plating is performed by applying a flux to a Ni or Ni—Fe based metal coating and then immersing the resultant in a plating bath. In the flux method, a predetermined alloy layer can be formed after the oxide film at the surface is efficiently removed, and therefore the effect of suppressing repelling of the plating is large. The flux method is a method of applying a flux aqueous solution of 2 to 45 mass % in terms of halogen to a steel sheet and plating the steel sheet. As the flux, a flux containing a chloride such as $ZnCl_2$, $NH_4Cl$ or HCl, or a bromide such as $ZnBr_2$ or $NH_4Br$ is effective. Furthermore, by applying a solution containing 1 to 10% of dilute hydrochloric acid to the steel sheet before applying the flux, the plating appearance is further improved. The temperature of the flux is set to 50° C. or higher. By setting the temperature to 50° C. or higher, it is possible to raise the temperature of the steel sheet after applying the flux and promote the removal of the oxide film and the alloying reaction on the surface of the steel sheet. The upper limit of the flux temperature is not particularly set. However, when the temperature is raised above 90° C., for example, the evaporation amount of the flux increases and handling of the treatment bath becomes difficult, which is not preferable.

Furthermore, the bath temperature of the Sn—Zn-based plating bath is set to 260° C. or higher. When the bath temperature is lower than 260° C., the diffusion alloy layer is not sufficiently formed, and there is concern that repelling of the plating may occur. Moreover, the upper limit of the bath temperature varies depending on the amount of Zn in the plating. For example, in a case where the amount of Zn of the plating bath is 20%, which is the upper limit, since the melting point of the plating bath is about 275° C., the upper limit of the bath temperature is preferably set to 350° C.

In the Sendzimir method, before immersing the steel sheet in the plating bath, the steel sheet temperature in the snout is adjusted to 50° C. or higher and the steel sheet is immersed in the plating bath adjusted to have a bath temperature of 260° C. or higher.

After plating, the adhesion amount of the plating is adjusted to 10 to 80 $g/m^2$ per one surface by air wiping or the like.

Through the above processes, the diffusion alloy layer in which the ratio of the phase primarily containing Sn—Fe—Cr—Zn (A phase) to the phase primarily containing Sn—Fe—Ni—Zn (B phase) is 0.01 or more and less than 2.5 and Ni, Sn, Cr, and Fe are contained can be formed, and the Sn—Zn-plated layer can be formed. The reason why the ratio of the A phase to the B phase is 0.01 or more is that when the ratio is less than 0.01, the A phase may not be formed and the oxide film of Cr may remain. That is, in the above case, there is concern that the plating properties may become poor. The upper limit of the ratio of the A phase to the B phase is determined by an immersion time in an operation and is thus set to less than 2.5, or 2.0 or less.

In this manner, it is possible to manufacture the hot-dip Sn—Zn-plated steel sheet having a good plating appearance as a product, and high corrosion resistance and excellent workability suitable for the vehicle field, particularly fuel tank applications. According to the manufacturing method of the present embodiment, it becomes possible to stably supply the hot-dip Sn—Zn-plated steel sheet of the present embodiment.

EXAMPLES

Hereinafter, the present invention will be described in more detail with reference to examples.

Example 1

Steel having the composition shown in Table 1 below was melted, and subjected to hot rolling, pickling, and cold rolling to produce a cold-rolled steel sheet having a thickness of 0.8 mm. After annealing this cold-rolled steel sheet, in an electrolytic pickling bath: a bath containing sulfuric acid (120 g/l)+sodium sulfate (120 g/l)+hexafluorosilicic acid (15 g/l) at a temperature of 50° C., electrolytic pickling was performed at 10 $A/dm^2$ for 5 seconds with the steel sheet side as an anode, and the surface was thereafter washed with water and dried to produce a pickled steel sheet. Thereafter, an Fe—Ni plating was applied into 1 $g/m^2$ and then hot-dip Sn—Zn plating was performed by the flux method. The composition of the Fe—Ni plating contained 25 mass % of Ni and the remainder consisting of Fe and impurities. The flux was a 1% HCl solution, and after applying the solution, a $ZnCl_2$—$NH_4Cl$ aqueous solution was applied with a roll. The Zn composition of a plating bath was as shown in Table 2. The steel sheet was immersed at a bath temperature of 290° C. and a sheet temperature at the time of immersion in the bath of 60° C., and plated for 8 seconds. Thereafter, the adhesion amount of the plating was adjusted by gas wiping.

The external appearance of the Sn—Zn-plated layer thus produced was evaluated based on the plating adhesion state by visually observing the surface of each plated steel sheet. Specifically, samples with no non-plating generated were evaluated as A, samples with non-plating were evaluated as X, and the samples evaluated as A were determined to be acceptable. Furthermore, the number of pinhole defects generated per unit area was examined with an optical microscope in a visual field of 50 times. Samples with 5/$mm^2$ or less were evaluated as A, samples with more than 5/$mm^2$ and 10/$mm^2$ or less were evaluated as B, samples with more than 10/$mm^2$ were evaluated as X, and the samples evaluated as A and the samples evaluated as B were determined to be acceptable.

The composition of elements at the surface of the steel sheet before plating was obtained from the integrated value at a depth up to 50 nm from the surface of the steel sheet based on the result measured by GDS. The coverage of the diffusion alloy layer formed was obtained by EPMA surface analysis after plating peeling.

Furthermore, for the level at which the plating appearance was good and the performance could be evaluated, corrosion resistance and workability shown below were each evaluated.

<Evaluation of Corrosion Resistance>

The corrosion resistance was evaluated by the following combined cycle test.

Figure 4:
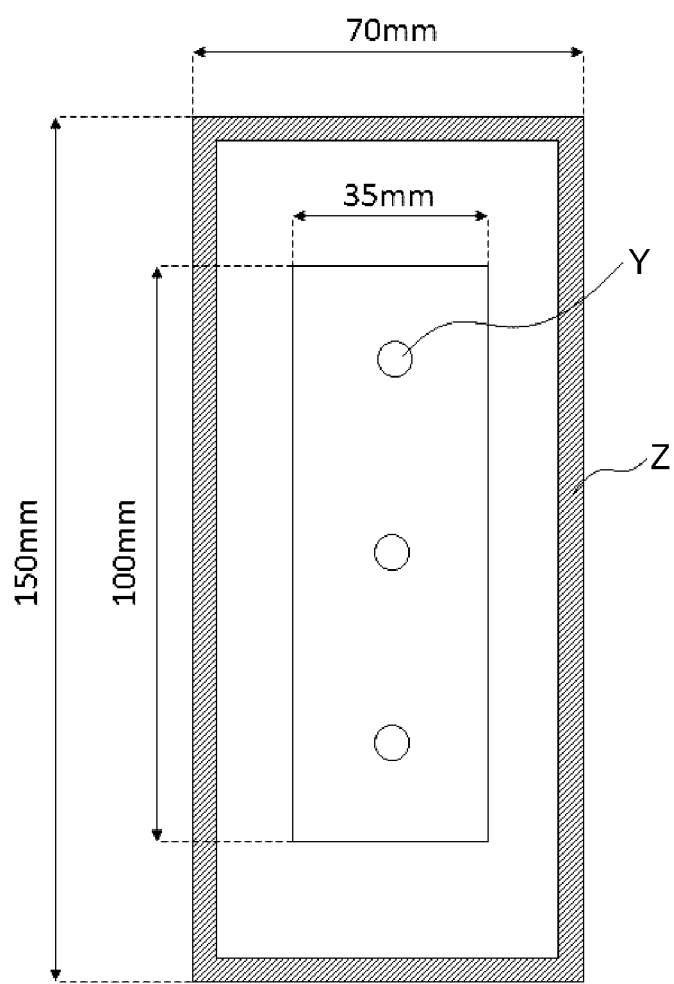
FIG. 4 is a schematic view of a sample material for a corrosion resistance test.

(x1) Outer Surface Corrosion Resistance:

As shown in a schematic view of a sample material for a corrosion resistance test in FIG. 4, a 70×150 mm flat sheet material and a sample material obtained by spot-welding a 35×100 mm sheet to a 70×150 mm sheet at three points were evaluated by the JASO (automotive standards by Japanese Automotive Standards Organization) M610-92 cosmetic corrosion test method for automotive parts. Here, in the 70×150 mm flat sheet material, the end surface and rear surface thereof were sealed. In FIG. 4, the three-point spot welding is indicated by spot welds Y, and the seals of the end surface and the rear surface are indicated by seal portions Z. A seal portion B was not provided in the 35×100 mm sheet. The evaluation was performed based on the rust generation area ratio of the flat sheet portion and the end surface portion of the 35×100 mm sheet. Samples with the end surface portion evaluated as A and samples evaluated as B were determined to be acceptable. In addition, samples evaluated as C were also determined to be acceptable because they could be used satisfactorily when coated.

[Evaluation Conditions]
Test period: 180 cycles (60 days)
[Evaluation Criteria](Evaluated by the Rust Generation Area Ratio)
A: Less than 0.1% of red rust generated
B: 0.1% or more and less than 1% of red rust generated or white rust generated (less than 20% of white rust)
C: 1% or more and less than 5% of red rust generated or white rust noticeable (20% or more and less than 90% of white rust)
X: 5% or more of red rust generated or white rust significant (more than 90% of white rust)
<Evaluation of Workability>
The workability was evaluated by a cylinder deep drawing test.
(y1) Cylinder deep drawing test: Cylinder deep drawing was performed using a flat-bottomed cylinder die having a punch diameter of φ50 mm. As a lubricating oil, Noxrust 530-F40 (manufactured by Nihon Parkerizing Co., Ltd.) was used, and the wrinkle suppression pressure was 700 kgf. The maximum drawing ratio (blank diameter÷punch diameter) that enabled drawing at that time and the plating appearance of the processed portion were evaluated. Samples evaluated as A and samples evaluated as B were determined to be acceptable.
[Evaluation Criteria]
A: Formable, no defects in the plated layer, drawing ratio 2.3 or more
B: Formable, no defects in the plated layer, drawing ratio 2.2 or more
C: Formable, no defects in the plated layer, drawing ratio 2.0 or more
X: Formable, but drawing ratio less than 2.0 or biting occurred in the plated layer

TABLE 1

| | Steel No. | Chemical composition (mass %) Remainder: iron and impurities | | | | | | | |
|---|---|---|---|---|---|---|---|---|---|
| | | C | Si | Mn | P | S | Cr | Cu | Ni |
| Inventive Examples | T1 | 0.0016 | 0.41 | 0.32 | 0.017 | 0.0038 | 10.7 | — | — |
| | T2 | 0.0220 | 0.06 | 0.31 | 0.019 | 0.0017 | 12.2 | — | — |
| | T3 | 0.0040 | 0.71 | 0.32 | 0.020 | 0.0023 | 14.4 | — | — |
| | T4 | 0.0055 | 0.50 | 0.18 | 0.019 | 0.0064 | 15.8 | — | — |
| | T5 | 0.0111 | 0.07 | 1.44 | 0.020 | 0.0035 | 17.8 | — | — |
| | T6 | 0.0040 | 0.43 | 0.32 | 0.008 | 0.0038 | 10.8 | — | — |
| | T7 | 0.0042 | 0.08 | 0.31 | 0.035 | 0.0037 | 10.9 | — | — |
| | T8 | 0.0032 | 0.06 | 0.34 | 0.025 | 0.0062 | 11.0 | — | — |
| | T9 | 0.0030 | 0.05 | 0.32 | 0.017 | 0.0033 | 10.9 | — | — |
| | T10 | 0.0027 | 0.05 | 0.41 | 0.020 | 0.0026 | 11.1 | — | — |
| | T11 | 0.0020 | 0.04 | 0.26 | 0.022 | 0.0028 | 10.6 | — | — |
| | T12 | 0.0047 | 0.05 | 0.51 | 0.018 | 0.0031 | 17.8 | — | — |
| | T13 | 0.0026 | 0.06 | 0.33 | 0.022 | 0.0028 | 9.1 | — | — |
| | T14 | 0.0020 | 0.06 | 0.31 | 0.011 | 0.0022 | 6.9 | — | — |
| Comparative Examples | t1 | <u>0.0410</u> | 0.11 | 0.31 | 0.021 | 0.0027 | 16.6 | — | — |
| | t2 | 0.0052 | <u>1.21</u> | 0.32 | 0.013 | 0.0030 | 10.7 | — | — |
| | t3 | 0.0032 | 0.43 | <u>3.02</u> | 0.016 | 0.0033 | 12.7 | — | — |
| | t4 | 0.0054 | 0.47 | 0.37 | <u>0.061</u> | 0.0043 | 10.9 | — | — |
| | t5 | 0.0077 | 0.72 | 0.52 | 0.016 | <u>0.0211</u> | 10.8 | — | — |
| | t6 | 0.0075 | 0.46 | 0.72 | 0.014 | 0.0043 | <u>0.06</u> | — | — |
| | t7 | 0.0078 | 0.41 | 0.29 | 0.014 | 0.0029 | <u>24.8</u> | — | — |
| | t8 | 0.0020 | 0.01 | 0.11 | 0.012 | 0.0030 | <u>0.01</u> | — | — |

Underlined values are out of scope of the present invention.

TABLE 2

| | No. | Steel No. | Concentration of elements at surface of pickled and annealed steel sheets | | | Diffusion alloy layer | | | Sn-Zn-plated layer | | |
|---|---|---|---|---|---|---|---|---|---|---|---|
| | | | Cr (%) | Si (%) | Mn (%) | Coverage (%) | Ratio of alloy phase (*) | Thickness μm | Composition Zn (%) | Adhesion amount (g/m²) | |
| Inventive Examples | U1 | T1 | 3.8 | 0.13 | 0.26 | 100 | 0.03 | 1.2 | 8 | 20 | |
| | U2 | T2 | 4.3 | 0.10 | 0.27 | 100 | 0.05 | 0.8 | 8 | 20 | |
| | U3 | T3 | 4.8 | 0.17 | 0.27 | 100 | 0.07 | 1.0 | 1 | 20 | |
| | U4 | T4 | 5.0 | 0.15 | 0.20 | 99 | 1.1 | 1.3 | 20 | 20 | |
| | U5 | T5 | 5.2 | 0.10 | 0.54 | 98 | 2.4 | 1.5 | 8 | 10 | |
| | U6 | T6 | 3.7 | 0.13 | 0.28 | 100 | 0.05 | 1.0 | 8 | 15 | |
| | U7 | T7 | 3.7 | 0.09 | 0.27 | 100 | 0.04 | 0.8 | 8 | 20 | |
| | U8 | T8 | 3.7 | 0.09 | 0.28 | 100 | 0.04 | 1.1 | 8 | 30 | |
| | U9 | T9 | 3.8 | 0.09 | 0.27 | 100 | 0.07 | 0.9 | 8 | 40 | |
| | U10 | T10 | 3.8 | 0.09 | 0.27 | 100 | 0.06 | 0.8 | 8 | 50 | |
| | U11 | T11 | 3.7 | 0.09 | 0.27 | 100 | 0.03 | 0.9 | 8 | 60 | |
| | U12 | T12 | 5.1 | 0.09 | 0.33 | 100 | 2.1 | 1.0 | 8 | 80 | |
| | U13 | T13 | 4.2 | 0.10 | 0.28 | 100 | 0.06 | 1.5 | 7 | 30 | |
| | U14 | T14 | 3.6 | 0.09 | 0.27 | 100 | 0.05 | 1.5 | 7 | 30 | |

TABLE 2-continued

| | | | | | | | | | | |
|---|---|---|---|---|---|---|---|---|---|---|
| Comparative Examples | u1 | t1 | 5.0 | 0.11 | 0.29 | 98 | 0.1 | 1.0 | 8 | 30 |
| | u2 | t2 | 4.0 | 0.31 | 0.30 | 5 | — | — | 8 | 30 |
| | u3 | t3 | 4.5 | 0.18 | 0.88 | 5 | — | — | 8 | 30 |
| | u4 | t4 | 4.1 | 0.13 | 0.45 | 98 | 0.08 | 0.9 | 8 | 30 |
| | u5 | t5 | 4.0 | 0.15 | 0.60 | 99 | 0.07 | 0.8 | 8 | 30 |
| | u6 | t6 | 0.1 | 0.13 | 0.78 | 100 | 0.06 | 0.9 | 8 | 30 |
| | u7 | t7 | 9.8 | 0.13 | 0.27 | 10 | — | — | 8 | 30 |
| | u8 | t8 | 0.0 | 0.01 | 0.05 | 100 | 0 | 2.0 | 8 | 30 |

| | | | | Evaluation of characteristics | | | | |
|---|---|---|---|---|---|---|---|---|
| | | | Plating appearance | | Corrosion resistance (outside) | | workability | |
| | | Steel | | | Plane | End | | |
| | No. | No. | Appearance | Pinhole | surface | surface | Cylinder | Remarks |
| Inventive Examples | U1 | T1 | A | A | A | B | A | |
| | U2 | T2 | A | A | B | B | B | |
| | U3 | T3 | A | B | B | B | B | |
| | U4 | T4 | A | A | B | B | B | |
| | U5 | T5 | A | B | B | B | B | |
| | U6 | T6 | A | A | A | B | A | |
| | U7 | T7 | A | A | A | B | B | |
| | U8 | T8 | A | A | A | B | A | |
| | U9 | T9 | A | A | A | A | A | |
| | U10 | T10 | A | A | A | A | A | |
| | U11 | T11 | A | A | A | A | A | |
| | U12 | T12 | A | A | A | A | B | |
| | U13 | T13 | A | A | A | B | A | |
| | U14 | T14 | A | A | B | B | A | |
| Comparative Examples | u1 | t1 | A | B | B | X | X | |
| | u2 | t2 | X | X | — | — | — | Plating defects are large (unevaluatable) |
| | u3 | t3 | X | X | — | — | — | Plating defects are large (unevaluatable) |
| | u4 | t4 | A | B | A | A | X | |
| | u5 | t5 | A | B | A | A | X | |
| | u6 | t6 | A | A | B | X | A | |
| | u7 | t7 | X | X | — | — | — | Plating defects are large (unevaluatable) |
| | u8 | t8 | A | A | B | X | A | |

*Ratio of alloy phase = Sn-Fe-Cr-Zn phase/Sn-Fe-Ni-Zn phase
Underlined values are out of scope of the present invention.

From the results shown in Table 2, in a case where the alloy layer does not satisfy the A phase/B phase ratio and the coverage, a good plating appearance is not obtained. In addition, as shown in Comparative Examples t1 to t8 in Table 2, in a case where the steel composition deviates from the conditions of the present invention, a good plating appearance or corrosion resistance which is desired are not obtained. By satisfying the conditions of the present invention, it is possible to obtain a Sn—Zn-plated steel sheet having both a good plating appearance and excellent corrosion resistance and being excellent in workability.

Example 2

Steel having the composition shown in Table 3 below was melted, and subjected to hot rolling, pickling, and cold rolling to produce a cold-rolled steel sheet having a thickness of 0.8 mm. After annealing this cold-rolled steel sheet, in an electrolytic pickling bath: a bath containing sulfuric acid (120 g/l)+sodium sulfate (120 g/l)+hexafluorosilicic acid (15 g/l) at a temperature of 50° C., electrolytic pickling was performed at 10 A/dm² for 5 seconds with the steel sheet side as an anode, and the surface was thereafter washed with water and dried to produce a pickled steel sheet. Thereafter, an Fe—Ni plating was applied into 1 g/m² and then hot-dip Sn—Zn plating was performed by the flux method. The composition of the Fe—Ni plating contained 25 mass % of Ni and the remainder consisting of Fe and impurities. The flux was a 1% HCl solution, and after applying the solution, a ZnCl₂—NH₄Cl aqueous solution was applied with a roll. The Zn composition of a plating bath was as shown in Table 4. The steel sheet was immersed at a bath temperature of 290° C. and a sheet temperature at the time of immersion in the bath of 60° C., and plated for 8 seconds. Thereafter, the adhesion amount of the plating was adjusted by gas wiping.

The external appearance of the Sn—Zn-plated layer thus produced was evaluated based on the plating adhesion state by visually observing the surface of each plated steel sheet. Specifically, samples with no non-plating generated were evaluated as A, samples with non-plating were evaluated as X, and the samples evaluated as A were determined to be acceptable. Furthermore, the number of pinhole defects generated per unit area was examined with an optical microscope in a visual field of 50 times. Samples with 5/mm² or less were evaluated as A, samples with more than 5/mm² and 10/mm² or less were evaluated as B, samples with more than 10/mm² were evaluated as X, and the samples evaluated as A and the samples evaluated as B were determined to be acceptable.

The composition of elements at the surface of the steel sheet before plating was obtained from the integrated value at a depth up to 50 nm from the surface of the steel sheet based on the result measured by GDS. The coverage of the diffusion alloy layer formed was obtained by EPMA surface analysis after plating peeling.

Furthermore, for the level at which the plating appearance was good and the performance could be evaluated, corrosion resistance and workability shown below were each evaluated.

<Evaluation of Corrosion Resistance>

Regarding the corrosion resistance, the outer surface corrosion resistance and the inner surface corrosion resistance in the case of a fuel tank material were evaluated.

(x1) Outer surface corrosion resistance: Evaluated in the same manner as in Example 1.

(x2) Inner surface corrosion resistance: Using the obtained test piece, a flanged cup was produced by cylinder deep drawing with a φ50 mm punch. A 10 mass % gasoline aqueous solution containing 100 ppm of formic acid, 200 ppm of acetic acid, and 165 ppm of NaCl was sealed in a cup in a total amount of 50 ml and left in a thermostat at 45° C. for 1000 hours. After the test, the samples were visually observed and the presence or absence of red rust generated on the bottom surface of the cup was checked. Samples evaluated as A and samples evaluated as B were determined to be acceptable.

[Evaluation Criteria]
  A: No rust
  B: White rust generated
  X: Red rust generated <Evaluation of Workability>

The workability was evaluated by a cylinder deep drawing test, a draw bead test, and a secondary workability test.

(y1) Cylinder deep drawing test: Evaluated in the same manner as in Example 1.

(y2) Draw bead test: A die having a bead portion of 4R and a die shoulder of 2R was used, and Noxrust 530-F40 (manufactured by Nihon Parkerizing Co., Ltd.) was used as a lubricating oil, and the test was performed by pressing down the die against a test piece with a hydraulic pressing force of 1000 kg. The width of the test piece was 30 mm, and the damage state of the plating on the portion that had passed through the bead after being pulled was examined by observing the cross section at 400 times. The observation length was set to 20 mm, and the occurrence of cracks in the plated layer was evaluated. Samples evaluated as A and samples evaluated as B were determined to be acceptable.

[Evaluation Criteria]
  A: Formable and no defects in the plated layer
  B: Formable, with slight sliding scratches
  C: Formable and cracks occurred in the plated layer
  X: Formable, local peeling occurred on the plated layer (y3) Secondary workability test: A blank material having a diameter of 95 mm was produced, and cylinder drawing with a drawing ratio of 1.9 was performed with a punch having an outer diameter of 50 mm to produce a drawn cup. The drawn cup was placed upside down on a truncated cone with a base angle of 30°, and under the temperature conditions of −40° C. and −50° C., a weight of 5 kg was dropped from a height of 1 μm, and whether or not cracking had occurred in the drawn cup was evaluated. Samples evaluated as A and samples evaluated as B were determined to be acceptable.

[Evaluation Criteria]
  A: No cracking occurred at −40° C. and −50° C.
  B: No cracking occurred at −40° C., slight cracks occurred at −50° C.
  X: Cracking occurred at −40° C.

TABLE 3

| | Steel No. | Chemical composition (mass %) Remainder: iron and impurities | | | | | | | | | | | | | |
|---|---|---|---|---|---|---|---|---|---|---|---|---|---|---|---|
| | | C | Si | Mn | P | S | Cr | Al | Ti | Nb | B | N | Cu | Ni | Mo | V |
| Inventive Examples | A1 | 0.0015 | 0.40 | 0.35 | 0.015 | 0.0041 | 10.9 | 0.04 | 0.052 | 0.011 | 0.0005 | 0.0070 | — | — | — | — |
| | A2 | 0.0220 | 0.05 | 0.33 | 0.020 | 0.0012 | 12.6 | 0.05 | 0.247 | 0.012 | 0.0005 | 0.0033 | — | — | — | — |
| | A3 | 0.0049 | 0.72 | 0.32 | 0.021 | 0.0025 | 14.5 | 0.09 | 0.111 | 0.006 | 0.0007 | 0.0050 | — | — | — | — |
| | A4 | 0.0060 | 0.51 | 0.19 | 0.020 | 0.0064 | 16.0 | 0.04 | 0.175 | 0.008 | 0.0010 | 0.0081 | — | — | — | — |
| | A5 | 0.0104 | 0.08 | 1.46 | 0.022 | 0.0037 | 17.7 | 0.05 | 0.217 | 0.022 | 0.0015 | 0.0111 | — | — | — | — |
| | A6 | 0.0042 | 0.45 | 0.33 | 0.008 | 0.0030 | 10.7 | 0.05 | 0.143 | 0.009 | 0.0006 | 0.0054 | — | — | — | — |
| | A7 | 0.0044 | 0.09 | 0.30 | 0.038 | 0.0030 | 10.9 | 0.04 | 0.132 | 0.008 | 0.0008 | 0.0044 | — | — | — | — |
| | A8 | 0.0040 | 0.05 | 0.34 | 0.028 | 0.0064 | 11.1 | 0.05 | 0.155 | 0.009 | 0.0006 | 0.0078 | — | — | — | — |
| | A9 | 0.0033 | 0.06 | 0.35 | 0.018 | 0.0031 | 10.9 | 0.03 | 0.123 | 0.011 | 0.0005 | 0.0044 | 0.05 | 0.05 | — | — |
| | A10 | 0.0023 | 0.07 | 0.45 | 0.020 | 0.0027 | 11.2 | 0.23 | 0.122 | 0.009 | 0.0007 | 0.0054 | 0.02 | 0.02 | — | — |
| | A11 | 0.0020 | 0.04 | 0.25 | 0.022 | 0.0029 | 10.5 | 0.05 | 0.156 | 0.010 | 0.0005 | 0.0098 | 0.3 | 0.6 | 0.03 | 0.02 |
| | A12 | 0.0044 | 0.05 | 0.55 | 0.017 | 0.0033 | 17.9 | 0.06 | 0.177 | 0.010 | 0.0005 | 0.0076 | — | 2.5 | — | — |
| | A13 | 0.0045 | 0.11 | 0.54 | 0.019 | 0.0017 | 12.7 | 0.05 | 0.052 | 0.008 | 0.0007 | 0.0054 | 1.5 | — | — | — |
| | A14 | 0.0034 | 0.12 | 0.12 | 0.018 | 0.0025 | 11.9 | 0.06 | 0.122 | 0.009 | 0.0003 | 0.0066 | — | 2.0 | — | — |
| | A15 | 0.0056 | 0.09 | 0.22 | 0.020 | 0.0076 | 10.9 | 0.07 | 0.134 | 0.006 | 0.0006 | 0.0087 | — | — | 1.5 | — |
| | A16 | 0.0078 | 0.07 | 0.88 | 0.022 | 0.0068 | 11.8 | 0.05 | 0.177 | 0.032 | 0.0009 | 0.0098 | — | — | — | 1.5 |
| | A17 | 0.0033 | 0.05 | 0.66 | 0.020 | 0.0023 | 11.8 | 0.04 | 0.166 | 0.015 | 0.0002 | 0.0101 | 0.6 | 1.0 | — | — |
| | A18 | 0.0033 | 0.08 | 0.70 | 0.018 | 0.0034 | 11.2 | 0.07 | 0.123 | 0.017 | 0.0025 | 0.0054 | — | 1.0 | 0.6 | — |
| | A19 | 0.0054 | 0.08 | 0.45 | 0.022 | 0.0030 | 11.5 | 0.08 | 0.110 | 0.015 | 0.0008 | 0.0033 | 0.3 | 0.6 | 0.5 | — |
| | A20 | 0.0067 | 0.07 | 0.56 | 0.020 | 0.0045 | 12.5 | 0.05 | 0.220 | 0.011 | 0.0006 | 0.0210 | — | 0.5 | — | 0.6 |
| | A21 | 0.0034 | 0.09 | 0.55 | 0.022 | 0.0032 | 11.3 | 0.05 | 0.133 | 0.009 | 0.0007 | 0.0078 | 0.3 | 0.6 | 0.8 | 0.9 |
| | A22 | 0.0042 | 0.12 | 0.45 | 0.028 | 0.0041 | 11.5 | 0.06 | 0.122 | 0.010 | 0.0007 | 0.0054 | 0.6 | 0.6 | 0.7 | 0.8 |
| Comparative Examples | a1 | <u>0.0420</u> | 0.10 | 0.32 | 0.023 | 0.0025 | 16.7 | 0.06 | <u>0.423</u> | <u>0.042</u> | 0.0005 | 0.0083 | — | — | — | — |
| | a2 | 0.0055 | <u>1.22</u> | 0.33 | 0.011 | 0.0020 | 10.9 | 0.04 | 0.156 | 0.015 | 0.0005 | 0.0078 | — | — | — | — |
| | a3 | 0.0034 | 0.40 | <u>3.01</u> | 0.018 | 0.0040 | 12.6 | 0.05 | 0.153 | 0.012 | 0.0006 | 0.0050 | — | — | — | — |
| | a4 | 0.0056 | 0.45 | 0.38 | <u>0.060</u> | 0.0041 | 10.9 | 0.09 | 0.134 | 0.009 | 0.0008 | 0.0077 | — | — | — | — |
| | a5 | 0.0078 | 0.77 | 0.53 | 0.014 | <u>0.0208</u> | 10.7 | 0.15 | 0.178 | 0.010 | 0.0009 | 0.0045 | — | — | — | — |
| | a6 | 0.0077 | 0.44 | 0.76 | 0.012 | 0.0042 | <u>0.06</u> | 0.08 | 0.134 | 0.009 | 0.0010 | 0.0060 | — | — | — | — |
| | a7 | 0.0087 | 0.42 | 0.33 | 0.013 | 0.0028 | <u>24.9</u> | 0.11 | 0.135 | 0.008 | 0.0006 | 0.0078 | — | — | — | — |

Underlined values are out of scope of the present invention.

TABLE 4

| | | Concentration of elements at surface of pickled and annealed steel sheets | | | Diffusion alloy layer | | | Sn-Zn-plated layer | |
|---|---|---|---|---|---|---|---|---|---|
| | Steel | Cr | Si | Mn | Coverage | Ratio of alloy | Thickness | Composition | Adhesion amount |
| No. | No. | (%) | (%) | (%) | (%) | phase (*) | (μm) | Zn (%) | (g/m²) |
| Inventive Examples | | | | | | | | | |
| B1 | A1 | 3.9 | 0.12 | 0.27 | 100 | 0.03 | 0.9 | 8 | 20 |
| B2 | A2 | 4.1 | 0.10 | 0.25 | 100 | 0.05 | 1.2 | 8 | 20 |
| B3 | A3 | 4.4 | 0.17 | 0.25 | 99 | 1.1 | 1.5 | 1 | 20 |
| B4 | A4 | 5.0 | 0.15 | 0.22 | 100 | 0.02 | 1.4 | 20 | 20 |
| B5 | A5 | 5.2 | 0.09 | 0.54 | 98 | 1.4 | 1.5 | 8 | 10 |
| B6 | A6 | 4.0 | 0.12 | 0.27 | 100 | 0.06 | 1.0 | 8 | 15 |
| B7 | A7 | 4.0 | 0.09 | 0.26 | 100 | 0.03 | 1.1 | 8 | 20 |
| B8 | A8 | 4.2 | 0.09 | 0.27 | 100 | 0.04 | 1.0 | 8 | 30 |
| B9 | A9 | 4.0 | 0.09 | 0.27 | 100 | 0.05 | 0.9 | 8 | 40 |
| B10 | A10 | 4.1 | 0.09 | 0.30 | 100 | 0.06 | 0.8 | 8 | 50 |
| B11 | A11 | 3.9 | 0.09 | 0.27 | 100 | 0.02 | 1.0 | 8 | 60 |
| B12 | A12 | 5.3 | 0.10 | 0.35 | 100 | 0.7 | 1.1 | 8 | 80 |
| B13 | A13 | 4.1 | 0.10 | 0.34 | 100 | 0.1 | 1.0 | 8 | 30 |
| B14 | A14 | 4.1 | 0.09 | 0.21 | 100 | 0.08 | 0.8 | 8 | 30 |
| B15 | A15 | 4.0 | 0.09 | 0.22 | 100 | 0.05 | 0.9 | 8 | 30 |
| B16 | A16 | 4.2 | 0.09 | 0.45 | 100 | 0.11 | 1.1 | 8 | 30 |
| B17 | A17 | 4.2 | 0.09 | 0.40 | 100 | 0.08 | 1.2 | 8 | 30 |
| B18 | A18 | 4.1 | 0.09 | 0.43 | 100 | 0.09 | 0.9 | 8 | 30 |
| B19 | A19 | 4.1 | 0.09 | 0.30 | 100 | 0.06 | 1.2 | 8 | 30 |
| B20 | A20 | 4.3 | 0.09 | 0.40 | 100 | 0.11 | 1.1 | 8 | 30 |
| B21 | A21 | 4.1 | 0.09 | 0.40 | 100 | 0.06 | 1.0 | 8 | 30 |
| B22 | A22 | 4.2 | 0.10 | 0.34 | 100 | 0.06 | 0.9 | 8 | 30 |
| Comparative Examples | | | | | | | | | |
| b1 | a1 | 5.0 | 0.10 | 0.27 | 98 | 0.1 | 0.9 | 8 | 30 |
| b2 | a2 | 4.0 | 0.33 | 0.28 | 5 | — | — | 8 | 30 |
| b3 | a3 | 4.2 | 0.12 | 0.88 | 5 | — | — | 8 | 30 |
| b4 | a4 | 4.0 | 0.12 | 0.40 | 98 | 0.08 | 0.9 | 8 | 30 |
| b5 | a5 | 3.9 | 0.15 | 0.43 | 99 | 0.07 | 1.0 | 8 | 30 |
| b6 | a6 | 0.1 | 0.12 | 0.45 | 100 | 0.06 | 0.9 | 8 | 30 |
| b7 | a7 | 9.6 | 0.12 | 0.30 | 10 | — | — | 8 | 30 |

| | | Evaluation of characteristics | | | | | | | |
|---|---|---|---|---|---|---|---|---|---|
| | | Plating appearance | | Corrosion resistance (outside) | | Corrosion resistance (inside) | Workability | | |
| | | | | | | | | | Embrittlement in |
| No. | Steel No. | Appearance | Pinhole | Plane surface | End surface | | Draw bead | Cylinder | secondary working | Remarks |
| Inventive Examples | | | | | | | | | | |
| B1 | A1 | A | A | A | B | B | A | A | A | |
| B2 | A2 | A | A | A | B | B | B | B | A | |
| B3 | A3 | A | B | B | B | B | B | B | A | |
| B4 | A4 | A | A | B | B | B | B | B | A | |
| B5 | A5 | A | B | B | B | B | B | B | A | |
| B6 | A6 | A | A | A | B | B | A | A | A | |
| B7 | A7 | A | A | A | B | B | B | B | A | |
| B8 | A8 | A | A | A | B | B | A | A | A | |
| B9 | A9 | A | A | A | A | B | A | A | A | |
| B10 | A10 | A | A | A | A | B | A | A | A | |
| B11 | A11 | A | A | A | A | B | A | A | A | |
| B12 | A12 | A | A | A | A | B | B | B | A | |
| B13 | A13 | A | A | A | A | B | A | A | A | |
| B14 | A14 | A | A | A | A | B | A | A | A | |
| B15 | A15 | A | A | A | A | B | A | A | A | |
| B16 | A16 | A | A | A | A | B | B | B | A | |
| B17 | A17 | A | A | A | A | B | A | A | B | |
| B18 | A18 | A | A | A | A | B | B | B | A | |
| B19 | A19 | A | A | A | A | B | A | A | A | |
| B20 | A20 | A | A | A | A | B | B | B | A | |
| B21 | A21 | A | A | A | A | B | A | A | A | |
| B22 | A22 | A | A | A | A | B | A | A | A | |

TABLE 4-continued

| | | | | | | | | | | | |
|---|---|---|---|---|---|---|---|---|---|---|---|
| Comparative Examples | b1 | <u>a1</u> | A | B | B | X | X | C | X | B | |
| | b2 | <u>a2</u> | X | X | — | — | — | — | — | — | Plating defects are large (unevaluatable) |
| | b3 | <u>a3</u> | X | X | — | — | — | — | — | — | Plating defects are large (unevaluatable) |
| | b4 | <u>a4</u> | A | B | A | A | B | X | X | X | |
| | b5 | <u>a5</u> | A | B | A | A | B | X | X | X | |
| | b6 | <u>a6</u> | A | A | B | X | X | A | A | A | |
| | b7 | <u>a7</u> | X | X | — | — | — | — | — | — | Plating defects are large (unevaluatable) |

*Ratio of alloy phase = Sn-Fe-Ci-Zn phase/Sn-Fe-Ni-Zn phase
Underlined values are out of scope of the present invention.

From the results shown in Table 4, a good plating appearance is not obtained in a case where the alloy layer does not satisfy the A phase/B phase ratio and the coverage. In addition, as shown in Comparative Examples b and b4 to b6 in Table 4, even at the level at which the plating properties were obtained, in a case where the steel composition deviates from the conditions of the present invention, either or both of good corrosion resistance and workability which are desired are not obtained. By satisfying the conditions of the present invention, it is possible to obtain a Sn—Zn-plated steel sheet having a good plating appearance and excellent corrosion resistance and workability.

Example 3

A plated steel sheet was produced in the same method as the manufacturing method described in Example 1 using the steel sheet A1 shown in Table 3, various coating treatments shown below were then performed, and thereafter corrosion resistance and workability were evaluated. The evaluation method is the same as in Example 2.

[Chemical Conversion Film]

c1: Trivalent chromate film: Formed by using a treatment liquid primarily containing $Cr^{3+}$ and containing water-dispersible silica and phosphoric acid, applying the treatment liquid onto the surface of the steel sheet with a bar coater so as to achieve a predetermined dry film thickness and a Cr:Si:P mass ratio of 1:3:2 in the film after drying, and drying the resultant at an ambient temperature of 240° C.

c2: Chromate-free film: Zr: Formed by using a treatment liquid containing Zr oxide, phosphoric acid, Ce nitrate, and water-dispersible silica, applying the treatment liquid onto the surface of the steel sheet with a bar coater so as to achieve a predetermined film thickness and a Zr:P:Ce:Si mass ratio of 5:2:1:2 in the film after drying, and drying the resultant at an ambient temperature of 180° C.

c3: A lubricating film containing 20 mass % of colloidal silica and 10 mass % of a polyethylene resin in a polyester-urethane resin film was formed by applying a solution which was the material of the lubricating film onto the surface of the steel sheet so as to achieve a predetermined dry coating film thickness and drying the resultant at an ambient temperature of 240° C. and an attainment sheet temperature of 150° C.

As the results shown in Table 5, Nos. C1 to C4 are plated steel sheets having a predetermined plating composition, adhesion amount, and alloy layer coverage described in the present invention, and satisfy all performances.

TABLE 5

| | | | Diffusion alloy layer | | | Sn-Zn plated layer | | Chemical Conversion Film | | Evaluation of characteristics | | | | | Workability | | |
|---|---|---|---|---|---|---|---|---|---|---|---|---|---|---|---|---|---|
| | | | | | | | | | | Plating appearance | | Corrosion resistance (outside) | | | | | Embrittlement in secondary working |
| | No. | Steel No. | Coverage (%) | Ratio of alloy phase (*) | Thickness (μm) | Composition Zn (%) | Adhesion amount (g/m²) | Type | Thickness (μm) | Appearance | Pinhole | Plane surface | End surface | Corrosion resistance (inside) | Draw bead | Cylinder | |
| Inventive Examples | C1 | A1 | 100 | 0.03 | 0.9 | 8 | 40 | c1 | 0.02 | A | A | A | B | B | A | A | A |
| | C2 | A6 | 100 | 0.05 | 1.2 | 8 | 30 | c3 | 1.2 | A | A | A | B | A | A | A | A |
| | C3 | A6 | 100 | 0.05 | 1.2 | 8 | 30 | c1 | 0.2 | A | A | A | B | A | A | A | A |
| | C4 | A6 | 100 | 0.05 | 1.2 | 8 | 30 | c2 | 0.3 | A | A | A | B | A | A | A | A |

*Ratio of alloy phase = Sn-Fe-Cr-Zn phase/Sn-Fe-Ni-Zn phase

Example 4

A plated steel sheet was produced in the same method as the manufacturing method described in Example 2 using the steel sheet A1 shown in Table 3, the film treatment c1 described in Example 3 was then applied, a coating film was thereafter formed, and corrosion resistance was evaluated. The evaluation method is the same as in Example 2. Regarding workability, evaluation was omitted because good results had already been obtained for the steel sheet A1.

TABLE 6

| | No. | Steel No. | Diffusion alloy layer Coverage (%) | Ratio of alloy phase (*) | Thickness (μm) | Sn-Zn plated layer Composition Zn (%) | Adhesion amount (g/m²) | Chemical Conversion Film Thickness (μm) | Coating film Type | Coating film Thickness (μm) | Plating appearance Appearance | Pinhole | Corrosion resistance (outside) Plane surface | End surface | Corrosion resistance (inside) |
|---|---|---|---|---|---|---|---|---|---|---|---|---|---|---|---|
| Inventive Examples | D1 | A1 | 100 | 0.03 | 0.9 | 8 | 30 | 0.3 | d1 | 10 | A | A | A | A | A |
| | D2 | A1 | 100 | 0.03 | 0.9 | 8 | 30 | 0.3 | d2 | 300 | A | A | A | A | A |
| | D3 | A1 | 100 | 0.03 | 0.9 | 8 | 30 | 0.3 | d1 | 15 | A | A | A | A | A |
| | D4 | A1 | 100 | 0.03 | 0.9 | 8 | 30 | 0.3 | d1 | 25 | A | A | A | A | A |
| | D5 | A1 | 100 | 0.03 | 0.9 | 8 | 30 | 0.3 | d2 | 100 | A | A | A | A | A |
| | D6 | A1 | 100 | 0.03 | 0.9 | 8 | 30 | 0.3 | d2 | 200 | A | A | A | A | A |

*Ratio of alloy phase = Sn-Fe-Cr-Zn phase/Sn-Fe-Ni-Zn phase

[Coating Film]

d1: Black coating: Produced by applying a coating primarily containing a styrene-butadiene resin and containing a black pigment to a test piece having a size of 70×150 mm so as to achieve a predetermined film thickness, and baking and drying the resultant under baking conditions of 140° C.×20 minutes.

d2: Chipping resistant coating: Produced by applying a coating primarily containing a urethane resin and a styrene-butadiene resin and containing a black pigment to a test piece having a size of 70×150 mm so as to achieve a predetermined film thickness, and baking and drying the resultant under baking conditions of 140° C.×20 minutes.

From the results shown in Table 6, Nos. D1 to D6 include, in addition to plated steel sheets having a predetermined plating composition, adhesion amount, and alloy layer coverage described in the present invention, the film treatment and coating film described in the present invention, and thus satisfy all performances while exhibiting excellent corrosion resistance.

Example 5

Steels having the compositions of A1, A3, A4, A5, A21, and A22 shown in Table 3 were melted, hot-rolled at a heating temperature of 1150° C. and a finish temperature of 900° C. in hot rolling, and thereafter subjected to sulfuric acid pickling in pickling and hot rolling, and then a cold-rolled steel sheet having a thickness of 0.8 mm is produced in cold rolling. This cold-rolled steel sheet was annealed in annealing to adjust the material, and then subjected to a pickling treatment under various conditions in pickling to produce a pickled cold-rolled steel sheet. The surface state of this pickled cold-rolled steel sheet was obtained as the surface concentration of each element from the integrated value at a depth up to 50 nm from the surface of the steel sheet based on the results measured by GDS as in Example 2.

An Fe—Ni plating was applied to these pickled cold-rolled steel sheets into 1 g/m² and then hot-dip Sn—Zn plating was performed by the flux method to evaluate the plating properties. The composition of the Fe—Ni plating contained 25 mass % of Ni and the remainder consisting of Fe and impurities. The flux was a 1% HCl solution, and after applying the solution, a $ZnCl_2$—$NH_4Cl$ aqueous solution was applied with a roll. The Zn composition of a plating bath was 8 mass % of Zn. The steel sheet was immersed at a bath temperature of 290° C. and a sheet temperature at the time of immersion in the bath of 60° C., and plated for 8 seconds. Thereafter, the adhesion amount of the plating was adjusted by gas wiping. The external appearance of the hot-dip Sn—Zn plating thus produced was evaluated based on the plating adhesion state by visually observing the surface of each hot-dip plated steel sheet. The plating appearance evaluation method is the same as that described in Example 2. In addition, the coverage of the formed alloy layer was obtained by EPMA surface analysis after plating peeling. Furthermore, for the level at which the plating appearance was good and the performance could be evaluated, corrosion resistance and workability were each evaluated in the same method as in the method described in Example 2.

TABLE 7

| | No. | Steel No. | Manufacturing method | Concentration of elements at surface of pickled and annealed steel sheets Cr (%) | Si (%) | Mn (%) | Diffusion alloy layer Coverage (%) | Ratio of alloy phase (*) | Thickness (μm) | Sn-Zn plated layer Composition Zn (%) | Adhesion amount (g/m²) | Chemical Conversion Film Thickness (μm) |
|---|---|---|---|---|---|---|---|---|---|---|---|---|
| Inventive Examples | E1 | A21 | F2 | 4.7 | 0.13 | 0.32 | 100 | 0.06 | 1.0 | 8 | 30 | 0.3 |
| | E2 | A22 | F2 | 4.9 | 0.15 | 0.30 | 100 | 0.06 | 0.9 | 8 | 30 | 0.3 |
| | E3 | A1 | F1 | 4.0 | 0.11 | 0.26 | 100 | 0.05 | 1.1 | 8 | 20 | 0.2 |
| | E4 | A6 | F1 | 4.1 | 0.13 | 0.26 | 100 | 0.04 | 1.0 | 8 | 20 | 0.2 |
| | E5 | A7 | F1 | 4.2 | 0.11 | 0.28 | 100 | 0.05 | 1.2 | 8 | 20 | 0.2 |
| | E6 | A8 | F2 | 4.1 | 0.09 | 0.28 | 100 | 0.04 | 1.2 | 8 | 20 | 0.2 |

TABLE 7-continued

| | No. | Steel No. | Pickling | | | | | | | | | |
|---|---|---|---|---|---|---|---|---|---|---|---|---|
| Comparative Examples | e1 | A1 | f1 | 7.1 | 0.19 | 0.43 | 5 | — | — | — | — | — |
| | e2 | A3 | f1 | 9.8 | 0.18 | 0.44 | 0 | — | — | — | — | — |
| | e3 | A4 | f2 | 5.3 | 0.30 | 0.45 | 5 | — | — | — | — | — |
| | e4 | A5 | f2 | 5.4 | 0.19 | 0.89 | 5 | — | — | — | — | — |

| | | | Evaluation of characteristics | | | | | | | | |
|---|---|---|---|---|---|---|---|---|---|---|---|
| | | | Coating film | Plating appearance | | Corrosion resistance (outside) | | | Workability | | |
| | No. | Steel No. | Thickness (µm) | Appearance | Pinhole | Plane surface | End surface | Corrosion resistance (inside) | Draw bead | Cylinder | Embrittlement in secondary working | Remarks |
| Inventive Examples | E1 | A21 | 150 | A | A | A | A | A | A | A | A | |
| | E2 | A22 | 150 | A | A | A | A | A | A | A | A | |
| | E3 | A1 | — | A | A | A | B | A | A | A | A | |
| | E4 | A6 | — | A | A | A | B | A | A | A | A | |
| | E5 | A7 | — | A | A | A | B | A | B | B | A | |
| | E6 | A8 | — | A | A | A | B | A | A | A | A | |
| Comparative Examples | e1 | A1 | — | — | — | — | — | — | — | — | — | Plating defects are large (unevaluatable) |
| | e2 | A3 | — | — | — | — | — | — | — | — | — | Plating defects are large (unevaluatable) |
| | e3 | A4 | — | — | — | — | — | — | — | — | — | Plating defects are large (unevaluatable) |
| | e4 | A5 | — | — | — | — | — | — | — | — | — | Plating defects are large (unevaluatable) |

*Ratio of alloy phase = Sn-Fe-Cr-Zn phase/Sn-Fe-Ni-Zn phase
Underlined values are out of scope of the present invention.

[Pickling Conditions of Cold-Rolled Steel Sheet]

F1: Sulfuric acid (120 g/l)+sodium sulfate (120 g/l)+sodium hexafluorosilicate (15 g/l), electrolyzed at a temperature of 50° C. and 10 A/dm$^2$ for 5 seconds F2: Sulfuric acid (100 g/l)+sodium nitrate (100 g/l)+potassium hexafluorosilicate (5 g/), electrolyzed at a temperature of 60° C. and 30 A/dm$^2$ for 6 seconds f1: Sulfuric acid (100 g/l)+sodium sulfate (100 g/l)+sodium hexafluorosilicate (10 g/l), electrolyzed at a temperature of 30° C. and 10 A/dm$^2$ for 5 seconds f2: Sulfuric acid (100 g/l), immersed at a temperature of 30° C. for 1 minute As shown in Table 7, by using the steel having the composition described in the present invention, producing the pickled cold-rolled steel sheet controlled to predetermined surface element concentrations, and performing the plating method described in the present invention, the diffusion alloy layer that leads to an excellent plating appearance is obtained, and the plated steel sheet produced under the conditions exhibits preferable corrosion resistance and workability as a fuel tank of a vehicle. On the other hand, as the results shown in the comparative examples, in a case where the surface element concentrations of the pickled cold-rolled steel sheet did not satisfy the present invention, it was difficult to obtain a good plating appearance, and it was difficult to evaluate corrosion resistance and workability.

Example 6

Steel having the composition shown in Table 8 below was melted, and hot-rolled, pickled, and cold-rolled to produce a cold-rolled steel sheet having a thickness of 0.8 mm. After annealing this cold-rolled steel sheet, in an electrolytic pickling bath: a bath containing sulfuric acid (100 g/l)+sodium sulfate (100 g/l)+hexafluorosilicic acid (10 g/l) at a temperature of 50° C., electrolytic pickling was performed at 10 A/dm$^2$ for 5 seconds with the steel sheet side as an anode, and the surface was thereafter washed with water and dried to produce a pickled steel sheet. Thereafter, an Fe—Ni plating was applied into 1 g/m$^2$ and then hot-dip Sn—Zn plating was performed by the flux method. The composition of the Fe—Ni plating contained 30 mass % of Ni and the remainder consisting of Fe and impurities. The flux was a 1% HCl solution, and after applying the solution, a $ZnCl_2$—$NH_4Cl$ aqueous solution was applied with a roll. The Zn composition of a plating bath was as shown in Table 9. The steel sheet was immersed at a bath temperature of 290° C. and a sheet temperature at the time of immersion in the bath of 60° C., and plated for 10 seconds. Thereafter, the adhesion amount of the plating was adjusted by gas wiping.

The external appearance of the Sn—Zn-plated layer thus produced was evaluated based on the plating adhesion state by visually observing the surface of each plated steel sheet. Specifically, samples with no non-plating generated were evaluated as A, samples with non-plating were evaluated as X, and the samples evaluated as A were determined to be acceptable. Furthermore, the number of pinhole defects generated per unit area was examined with an optical microscope in a visual field of 50 times. Samples with 5/mm$^2$ or less were evaluated as A, samples with more than 5/mm$^2$ and 10/mm$^2$ or less were evaluated as B, samples with more than 10/mm$^2$ were evaluated as X, and the samples evaluated as A and the samples evaluated as B were determined to be acceptable.

The composition of elements at the surface of the steel sheet before plating was obtained from the integrated value at a depth up to 50 nm from the surface based on the result measured by GDS. The coverage of the alloy layer formed was obtained by EPMA surface analysis after plating peeling.

Furthermore, for the level at which the plating appearance was good and the performance could be evaluated, corrosion resistance and workability shown below were each evaluated.

<Evaluation of Corrosion Resistance>

Regarding the corrosion resistance, the outer surface corrosion resistance was evaluated by a combined cycle test.

(x1) Outer surface corrosion resistance: A 70×150 mm flat sheet material and a sample material obtained by spot-welding a 35×100 mm sheet to a 70×150 mm sheet at three points were evaluated by the JASO (automotive standards by Japanese Automotive Standards Organization) M610-92 cosmetic corrosion test method for automotive parts. Samples A and B were determined to be acceptable.

[Evaluation Conditions]
Test period: 180 cycles (60 days)

[Evaluation Criteria]
A: Less than 0.1% of red rust generated
B: 0.1% or more and less than 1% of red rust generated or white rust generated
C: 1% or more and less than 5% of red rust generated or white rust noticeable
X: 5% or more of red rust generated or white rust significant <Evaluation of Workability>

(y1) Cylinder deep drawing test: Cylinder deep drawing was performed using a flat-bottomed cylinder die having a punch diameter of φ50 mm. As a lubricating oil, Noxrust 530-F40 (manufactured by Nihon Parkerizing Co., Ltd.) was used, and the wrinkle suppression pressure was 700 kgf. The maximum drawing ratio (blank diameter÷punch diameter) that enabled drawing at that time and the plating appearance of the processed portion were evaluated. Samples A and B were determined to be acceptable.

[Evaluation Criteria]
A: Formable, no defects in the plated layer, drawing ratio 2.3 or more
B: Formable, no defects in the plated layer, drawing ratio 2.2 or more
C: Formable, no defects in the plated layer, drawing ratio 2.0 or more
X: Formable, but drawing ratio less than 2.0 or biting occurred in the plated layer

TABLE 8

| | Steel No. | Chemical composition (mass %) Remainder: iron and impurities | | | | | | | |
|---|---|---|---|---|---|---|---|---|---|
| | | C | Si | Mn | P | S | Cr | Cu | Ni |
| Inventive Examples | T1' | 0.0015 | 0.20 | 0.33 | 0.015 | 0.0043 | 5.1 | 0.07 | 0.11 |
| | T2' | 0.0203 | 0.06 | 0.34 | 0.023 | 0.0018 | 7.1 | 0.05 | 0.10 |
| | T3' | 0.0055 | 0.72 | 0.32 | 0.022 | 0.0029 | 9.4 | 0.06 | 0.09 |
| | T4' | 0.0042 | 0.57 | 0.17 | 0.022 | 0.0063 | 10.0 | 0.08 | 0.09 |
| | T5' | 0.0109 | 0.04 | 1.33 | 0.024 | 0.0032 | 10.4 | 0.09 | 0.11 |
| | T6' | 0.0040 | 0.41 | 0.33 | 0.009 | 0.0033 | 7.1 | 0.07 | 0.11 |
| | T7' | 0.0041 | 0.09 | 0.30 | 0.034 | 0.0036 | 7.6 | 0.07 | 0.12 |
| | T8' | 0.0042 | 0.07 | 0.33 | 0.027 | 0.0062 | 7.5 | 0.08 | 0.12 |
| | T9' | 0.0036 | 0.05 | 0.36 | 0.024 | 0.0033 | 8.1 | 0.06 | 0.09 |
| | T10' | 0.0034 | 0.08 | 0.39 | 0.005 | 0.0027 | 9.0 | 0.02 | 0.02 |
| | T11' | 0.0025 | 0.07 | 0.31 | 0.023 | 0.0023 | 4.1 | 0.33 | 0.60 |
| | T12' | 0.0042 | 0.06 | 0.53 | 0.019 | 0.0034 | 10.4 | 0.08 | 2.30 |
| Comparative Examples | t1' | <u>0.0424</u> | 0.10 | 0.32 | 0.023 | 0.0026 | 7.4 | 0.08 | 0.11 |
| | t2' | 0.0052 | <u>1.22</u> | 0.36 | 0.019 | 0.0027 | 9.4 | 0.07 | 0.12 |
| | t3' | 0.0039 | 0.44 | <u>3.13</u> | 0.016 | 0.0033 | 5.4 | 0.07 | 0.08 |
| | t4' | 0.0052 | 0.42 | 0.32 | <u>0.062</u> | 0.0040 | 7.5 | 0.08 | 0.10 |
| | t5' | 0.0072 | 0.72 | 0.50 | 0.019 | <u>0.0210</u> | 7.4 | 0.08 | 0.10 |
| | t6' | 0.0071 | 0.44 | 0.77 | 0.016 | 0.0040 | <u>0.1</u> | 0.08 | 0.10 |
| | t7' | 0.0081 | 0.42 | 0.33 | 0.017 | 0.0023 | <u>23.0</u> | 0.08 | 0.11 |

Underlined values are out of scope of the present invention.

TABLE 9

| | No. | Steel No. | Concentration of elements at surface of pickled and annealed steel sheets | | | Diffusion alloy layer | | | Sn-Zn plated layer | | Plating | | Evaluation of characteristics | | | | |
|---|---|---|---|---|---|---|---|---|---|---|---|---|---|---|---|---|---|
| | | | | | | | | | | | | | | Corrosion resistance (outside) | | | |
| | | | Cr (%) | Si (%) | Mn (%) | Cov-er-age (%) | Ratio of alloy phase (*) | Thick-ness (μm) | Com-position Zn (%) | Adhesion amount (g/m²) | Appear-ance | Pin-hole | Plane sur-face | End sur-face | Work-ability Cylinder | Remarks |
| Inventive Examples | U1' | T1' | 3.6 | 0.10 | 0.16 | 100 | 0.04 | 1.1 | 8 | 20 | A | A | B | B | A | |
| | U2' | T2' | 4.5 | 0.03 | 0.17 | 100 | 0.06 | 1.3 | 8 | 20 | A | A | B | B | B | |
| | U3' | T3' | 4.8 | 0.18 | 0.16 | 99 | 1.3 | 1.5 | 1 | 20 | A | B | B | B | B | |
| | U4' | T4' | 5.5 | 0.16 | 0.06 | 100 | 0.03 | 1.0 | 20 | 20 | A | A | B | B | B | |
| | U5' | T5' | 5.5 | 0.02 | 0.50 | 98 | 1.8 | 1.6 | 8 | 10 | A | B | B | B | B | |
| | U6' | T6' | 4.8 | 0.14 | 0.18 | 100 | 0.07 | 1.0 | 8 | 15 | A | A | A | B | A | |
| | U7' | T7' | 4.8 | 0.05 | 0.17 | 100 | 0.05 | 1.2 | 8 | 20 | A | A | B | B | B | |
| | U8' | T8' | 4.8 | 0.04 | 0.16 | 100 | 0.06 | 1.3 | 8 | 30 | A | A | B | B | A | |
| | U9' | T9' | 5.0 | 0.03 | 0.17 | 100 | 0.03 | 1.4 | 8 | 40 | A | A | A | B | A | |
| | U10' | T10' | 5.2 | 0.04 | 0.22 | 100 | 0.04 | 1.2 | 8 | 50 | A | A | A | B | A | |

TABLE 9-continued

|  |  |  |  |  |  |  |  |  |  |  |  |  |  |  |  |  |
|---|---|---|---|---|---|---|---|---|---|---|---|---|---|---|---|---|
|  | U11' | T11' | 3.5 | 0.04 | 0.16 | 100 | 0.03 | 1.3 | 8 | 60 | A | A | A | B | A |  |
|  | U12' | T12' | 5.4 | 0.03 | 0.27 | 100 | 0.8 | 1.5 | 8 | 80 | A | A | A | B | B |  |
| Comparative Examples | u1' | t1' | 4.5 | 0.05 | 0.17 | 98 | 0.2 | 1.3 | 8 | 30 | A | B | B | X | X |  |
|  | u2' | t2' | 5.1 | 0.44 | 0.18 | 5 | — | — | 8 | 30 | X | X | — | — | — | Plating defects are large (unevaluatable) |
|  | u3' | t3' | 4.0 | 0.14 | 0.98 | 5 | — | — | 8 | 30 | X | X | — | — | — | Plating defects are large (unevaluatable) |
|  | u4' | t4' | 4.5 | 0.14 | 0.16 | 98 | 0.07 | 1.3 | 8 | 30 | A | B | A | B | X |  |
|  | u5' | t5' | 4.5 | 0.18 | 0.22 | 99 | 0.07 | 1.3 | 8 | 30 | A | B | A | B | X |  |
|  | u6' | t6' | 0.1 | 0.15 | 0.33 | 100 | 0.08 | 1.2 | 8 | 30 | A | A | B | X | A |  |
|  | u7' | t7' | 9.9 | 0.16 | 0.16 | 10 | — | — | 8 | 30 | X | X | — | — | — | Plating defects are large (unevaluatable) |

*Ratio of alloy phase = Sn-Fe-Cr-Zn phase/Sn-Fe-Ni-Zn phase
Underlined values are out of scope of the present invention.

From the results shown in Table 9, in a case where the alloy layer does not satisfy the ratio of the Sn—Fe—Cr—Zn phase (A phase) to the Sn—Fe—Ni—Zn phase (B phase) and the coverage, a good plating appearance is not obtained. In addition, as shown in Comparative Examples u1' to u7' of Table 9, even at the level at which the plating properties were obtained, in a case where the steel composition deviates from the conditions of the present invention, either or both of good corrosion resistance and workability which are desired are not obtained. By satisfying the conditions of the present invention, it is possible to obtain a Sn—Zn-plated steel sheet having a good plating appearance and excellent corrosion resistance and workability, and also having excellent workability.

Example 7

Steel having the composition shown in Table 10 below was melted, and hot-rolled, pickled, and cold-rolled to produce a cold-rolled steel sheet having a thickness of 0.8 mm. After annealing this cold-rolled steel sheet, in an electrolytic pickling bath: a bath containing sulfuric acid (100 g/l)+sodium sulfate (100 g/l)+hexafluorosilicic acid (10 g/l) at a temperature of 50° C., electrolytic pickling was performed at 10 A/dm$^2$ for 5 seconds with the steel sheet side as an anode, and the surface was thereafter washed with water and dried to produce a pickled steel sheet. Thereafter, an Fe—Ni plating was applied into 1 g/m$^2$ and then hot-dip Sn—Zn plating was performed by the flux method. The composition of the Fe—Ni plating contained 30 mass % of Ni and the remainder consisting of Fe and impurities. The flux was a 1% HCl solution, and after applying the solution, a $ZnCl_2$—$NH_4Cl$ aqueous solution was applied with a roll. The Zn composition of a plating bath was as shown in Table 11. The steel sheet was immersed at a bath temperature of 290° C. and a sheet temperature at the time of immersion in the bath of 60° C., and plated for 10 seconds. Thereafter, the adhesion amount of the plating was adjusted by gas wiping.

The external appearance of the Sn—Zn-plated layer thus produced was evaluated based on the plating adhesion state by visually observing the surface of each plated steel sheet. Specifically, samples with no non-plating generated were evaluated as A, samples with non-plating were evaluated as X, and the samples evaluated as A were determined to be acceptable. Furthermore, the number of pinhole defects generated per unit area was examined with an optical microscope in a visual field of 50 times. Samples with 5/mm$^2$ or less were evaluated as A, samples with more than 5/mm$^2$ and 10/mm$^2$ or less were evaluated as B, samples with more than 10/mm$^2$ were evaluated as X, and the samples evaluated as A and the samples evaluated as B were determined to be acceptable.

The composition of elements at the surface of the steel sheet before plating was obtained from the integrated value at a depth up to 50 nm from the surface of the steel sheet based on the result measured by GDS. The coverage of the alloy layer formed was obtained by EPMA surface analysis after plating peeling.

Furthermore, for the level at which the plating appearance was good and the performance could be evaluated, corrosion resistance and workability shown below were each evaluated.

<Evaluation of Corrosion Resistance>

Regarding the corrosion resistance, the outer surface corrosion resistance and the inner surface corrosion resistance in the case of a fuel tank material were evaluated.

(x1) Outer surface corrosion resistance: Evaluated in the same manner as in Example 6.

(x2) Inner surface corrosion resistance: Using the obtained test piece, a flanged cup was produced by cylinder deep drawing with a φ50 mm punch. A 10 mass % gasoline aqueous solution containing 100 ppm of formic acid, 200 ppm of acetic acid, and 165 ppm of NaCl was sealed in a cup in a total amount of 50 ml and left in a thermostat at 45° C. for 1000 hours. After the test, the samples were visually observed and the presence or absence of red rust generated on the bottom surface of the cup was checked. Samples evaluated as A and samples evaluated as B were determined to be acceptable.

[Evaluation Criteria]
 A: No rust
 B: White rust generated
 X: Red rust generated <Evaluation of Workability>

The workability was evaluated by a cylinder deep drawing test, a draw bead test, and a secondary workability test.

(y1) Cylinder deep drawing test: Evaluated in the same manner as in Example 6.

(y2) Draw bead test: A die having a bead portion of 4R and a die shoulder of 2R was used, and Noxrust 530-F40 (manufactured by Nihon Parkerizing Co., Ltd.) was used as a lubricating oil, and the test was performed by pressing down the die against a test piece with a hydraulic pressing force of 1000 kg. The width of the test piece was 30 mm, and the damage state of the plating on the portion that had passed through the bead after being pulled was examined by observing the cross section at 400 times. The observation length was set to 20 mm, and the occurrence of cracks in the plated layer was evaluated. Samples evaluated as A and samples evaluated as B were determined to be acceptable.

[Evaluation Criteria]
A: Formable and no defects in the plated layer
B: Formable, with slight sliding scratches
C: Formable and cracks occurred in the plated layer
X: Formable, local peeling occurred on the plated layer (y3) Secondary workability test: A blank material having a diameter of 95 mm was produced, and cylinder drawing with a drawing ratio of 1.9 was performed with a punch having an outer diameter of 50 mm to produce a drawn cup. The drawn cup was placed upside down on a truncated cone with a base angle of 30°, and under the temperature conditions of −40° C. and −50° C., a weight of 5 kg was dropped from a height of 1 μm, and whether or not cracking had occurred in the drawn cup was evaluated. Samples evaluated as A and samples evaluated as B were determined to be acceptable.

[Evaluation Criteria]
A: No cracking occurred at −40° C. and −50° C.
B: No cracking occurred at −40° C., slight cracks occurred at −50° C.
X: Cracking occurred at −40° C.

TABLE 10

| | Steel No. | Chemical composition (mass %) Remainder: iron and impurities | | | | | | | | | | | | | | |
|---|---|---|---|---|---|---|---|---|---|---|---|---|---|---|---|---|
| | | C | Si | Mn | P | S | Cr | Al | Ti | Nb | B | N | Cu | Ni | Mo | V |
| Inventive Examples | A1' | 0.0016 | 0.20 | 0.34 | 0.016 | 0.0042 | 5.0 | 0.05 | 0.053 | 0.011 | 0.0005 | 0.0044 | 0.08 | 0.12 | — | — |
| | A2' | 0.0212 | 0.06 | 0.32 | 0.022 | 0.0017 | 7.2 | 0.05 | 0.233 | 0.009 | 0.0006 | 0.0220 | 0.05 | 0.11 | — | — |
| | A3' | 0.0053 | 0.71 | 0.32 | 0.022 | 0.0028 | 9.5 | 0.08 | 0.119 | 0.010 | 0.0006 | 0.0034 | 0.06 | 0.09 | — | — |
| | A4' | 0.0044 | 0.53 | 0.18 | 0.024 | 0.0064 | 10.1 | 0.06 | 0.171 | 0.010 | 0.0006 | 0.0056 | 0.07 | 0.09 | — | — |
| | A5' | 0.0110 | 0.06 | 1.34 | 0.020 | 0.0033 | 10.3 | 0.05 | 0.212 | 0.008 | 0.0016 | 0.0112 | 0.09 | 0.12 | — | — |
| | A6' | 0.0044 | 0.44 | 0.35 | 0.008 | 0.0033 | 7.3 | 0.07 | 0.142 | 0.009 | 0.0005 | 0.0034 | 0.08 | 0.11 | — | — |
| | A7' | 0.0045 | 0.08 | 0.20 | 0.035 | 0.0039 | 7.7 | 0.06 | 0.133 | 0.010 | 0.0005 | 0.0045 | 0.07 | 0.13 | — | — |
| | A8' | 0.0047 | 0.06 | 0.35 | 0.026 | 0.0062 | 7.5 | 0.05 | 0.158 | 0.010 | 0.0007 | 0.0073 | 0.08 | 0.12 | — | — |
| | A9' | 0.0035 | 0.05 | 0.35 | 0.023 | 0.0034 | 8.0 | 0.04 | 0.124 | 0.011 | 0.0010 | 0.0043 | 0.06 | 0.08 | — | — |
| | A10' | 0.0033 | 0.08 | 0.40 | 0.020 | 0.0028 | 9.0 | 0.24 | 0.126 | 0.009 | 0.0006 | 0.0056 | 0.02 | 0.02 | — | — |
| | A11 | 0.0027 | 0.05 | 0.28 | 0.022 | 0.0022 | 4.1 | 0.06 | 0.152 | 0.010 | 0.0008 | 0.0091 | 0.32 | 0.65 | 0.03 | 0.03 |
| | A12' | 0.0043 | 0.05 | 0.53 | 0.018 | 0.0035 | 10.4 | 0.06 | 0.178 | 0.010 | 0.0006 | 0.0073 | 0.08 | 2.6 | — | — |
| | A13' | 0.0040 | 0.12 | 0.52 | 0.018 | 0.0019 | 5.5 | 0.04 | 0.055 | 0.008 | 0.0005 | 0.0056 | 1.5 | 0.12 | — | — |
| | A14' | 0.0033 | 0.11 | 0.12 | 0.018 | 0.0023 | 6.0 | 0.05 | 0.123 | 0.009 | 0.0003 | 0.0062 | 0.08 | 2.10 | — | — |
| | A15' | 0.0057 | 0.08 | 0.28 | 0.022 | 0.0075 | 7.2 | 0.06 | 0.132 | 0.005 | 0.0006 | 0.0087 | 0.09 | 0.11 | 1.4 | — |
| | A16' | 0.0079 | 0.07 | 0.87 | 0.021 | 0.0068 | 7.5 | 0.05 | 0.178 | 0.033 | 0.0009 | 0.0094 | 0.07 | 0.12 | — | 1.4 |
| | A17' | 0.0037 | 0.06 | 0.66 | 0.020 | 0.0022 | 7.7 | 0.05 | 0.163 | 0.015 | 0.0002 | 0.0089 | 0.61 | 1.01 | — | — |
| | A18' | 0.0035 | 0.07 | 0.72 | 0.019 | 0.0032 | 7.2 | 0.06 | 0.120 | 0.011 | 0.0026 | 0.0056 | 0.08 | 1.05 | 0.7 | — |
| | A19' | 0.0058 | 0.08 | 0.43 | 0.021 | 0.0028 | 7.2 | 0.07 | 0.118 | 0.012 | 0.0007 | 0.0032 | 0.35 | 0.62 | 0.7 | — |
| | A20' | 0.0069 | 0.09 | 0.55 | 0.020 | 0.0043 | 9.5 | 0.05 | 0.222 | 0.006 | 0.0005 | 0.0212 | 0.08 | 0.51 | — | 0.7 |
| | A21' | 0.0033 | 0.08 | 0.58 | 0.022 | 0.0033 | 9.6 | 0.06 | 0.135 | 0.008 | 0.0005 | 0.0072 | 0.33 | 0.62 | 0.9 | 0.9 |
| | A22' | 0.0044 | 0.11 | 0.45 | 0.024 | 0.0044 | 9.5 | 0.06 | 0.129 | 0.022 | 0.0007 | 0.0059 | 0.63 | 0.88 | 0.5 | 0.7 |
| Comparative Examples | a1' | <u>0.0428</u> | 0.10 | 0.33 | 0.023 | 0.0027 | 7.5 | 0.05 | <u>0.438</u> | 0.024 | 0.0005 | 0.0084 | 0.09 | 0.12 | — | — |
| | a2' | 0.0053 | <u>1.25</u> | 0.34 | 0.019 | 0.0026 | 9.5 | 0.05 | 0.152 | 0.010 | 0.0005 | 0.0078 | 0.08 | 0.11 | — | — |
| | a3' | 0.0038 | 0.43 | <u>3.12</u> | 0.017 | 0.0030 | 5.5 | 0.05 | 0.155 | 0.011 | 0.0006 | 0.0030 | 0.07 | 0.09 | — | — |
| | a4' | 0.0059 | 0.45 | 0.34 | <u>0.063</u> | 0.0042 | 7.5 | 0.08 | 0.132 | 0.009 | 0.0005 | 0.0073 | 0.06 | 0.09 | — | — |
| | a5' | 0.0079 | 0.77 | 0.55 | 0.018 | <u>0.0211</u> | 7.4 | 0.12 | 0.179 | 0.008 | 0.0006 | 0.0043 | 0.08 | 0.1 | — | — |
| | a6' | 0.0072 | 0.45 | 0.73 | 0.015 | 0.0043 | <u>0.05</u> | 0.07 | 0.133 | 0.009 | 0.0006 | 0.0020 | 0.08 | 0.12 | — | — |
| | a7' | 0.0082 | 0.43 | 0.34 | 0.017 | 0.0029 | <u>23.5</u> | 0.12 | 0.139 | 0.008 | 0.0005 | 0.0072 | 0.07 | 0.11 | — | — |
| | a8' | 0.0056 | 0.48 | 0.49 | 0.015 | 0.0036 | 9.4 | 0.05 | 0.132 | 0.004 | 0.0006 | 0.0055 | <u>4.5</u> | 0.15 | — | — |
| | a9' | 0.0045 | 0.06 | 0.46 | 0.014 | 0.0041 | 9.5 | 0.06 | 0.155 | 0.007 | 0.0006 | 0.0046 | 0.09 | <u>5.5</u> | — | — |
| | a10' | 0.0020 | 0.01 | 0.11 | 0.012 | 0.0030 | 0.01 | 0.04 | 0.050 | 0.003 | 0.0005 | 0.0020 | 0.02 | 0.02 | — | — |

Underlined values are out of scope of the present invention.

TABLE 11

| | | | Concentration of elements at surface of pickled and annealed steel sheets | | | Diffusion alloy layer | | | Sn—Zn plated layer | |
|---|---|---|---|---|---|---|---|---|---|---|
| | | Steel No. | Cr (%) | Si (%) | Mn (%) | Coverage (%) | Ratio of alloy phase (*) | Thickness (μm) | Composition Zn (%) | Adhesion amount (g/m²) |
| | No. | | | | | | | | | |
| Inventive Examples | B1' | A1' | 3.7 | 0.11 | 0.15 | 100 | 0.03 | 1.2 | 8 | 20 |
| | B2' | A2' | 4.6 | 0.03 | 0.17 | 100 | 0.05 | 1.1 | 8 | 20 |
| | B3' | A3' | 4.7 | 0.17 | 0.17 | 99 | 1.1 | 1.3 | 1 | 20 |
| | B4' | A4' | 5.4 | 0.17 | 0.07 | 100 | 0.02 | 1.3 | 20 | 20 |
| | B5' | A5' | 5.4 | 0.02 | 0.51 | 98 | 1.4 | 1.3 | 8 | 10 |
| | B6' | A6' | 4.9 | 0.15 | 0.19 | 100 | 0.06 | 1.0 | 8 | 15 |
| | B7' | A7' | 4.7 | 0.06 | 0.18 | 100 | 0.03 | 1.2 | 8 | 20 |
| | B8' | A8' | 4.8 | 0.05 | 0.17 | 100 | 0.04 | 1.1 | 8 | 30 |

TABLE 11-continued

|  | No. | Steel No. | | | | | | | | | |
|---|---|---|---|---|---|---|---|---|---|---|---|
|  | B9' | A9' | 4.9 | 0.04 | 0.18 | 100 | 0.05 | 1.0 | 8 | 40 |
|  | B10' | A10' | 5.1 | 0.04 | 0.20 | 100 | 0.06 | 1.3 | 8 | 50 |
|  | B11' | A11' | 3.6 | 0.04 | 0.17 | 100 | 0.02 | 1.4 | 8 | 60 |
|  | B12' | A12' | 5.4 | 0.05 | 0.28 | 100 | 0.70 | 1.2 | 8 | 80 |
|  | B13' | A13' | 4.2 | 0.08 | 0.28 | 100 | 0.10 | 1.2 | 8 | 30 |
|  | B14' | A14' | 4.2 | 0.07 | 0.08 | 100 | 0.08 | 1.1 | 8 | 30 |
|  | B15' | A15' | 4.7 | 0.04 | 0.11 | 100 | 0.05 | 1.3 | 8 | 30 |
|  | B16' | A16' | 4.8 | 0.04 | 0.30 | 100 | 0.11 | 1.3 | 8 | 30 |
|  | B17' | A17' | 4.8 | 0.04 | 0.26 | 100 | 0.08 | 1.2 | 8 | 30 |
|  | B18' | A18' | 4.7 | 0.04 | 0.29 | 100 | 0.09 | 1.1 | 8 | 30 |
|  | B19' | A19' | 4.7 | 0.04 | 0.16 | 100 | 0.06 | 1.2 | 8 | 30 |
|  | B20' | A20' | 5.0 | 0.04 | 0.22 | 100 | 0.11 | 1.0 | 8 | 30 |
|  | B21' | A21' | 5.1 | 0.04 | 0.21 | 100 | 0.06 | 1.1 | 8 | 30 |
|  | B22' | A22' | 5.1 | 0.06 | 0.17 | 100 | 0.06 | 1.1 | 8 | 30 |
| Comparative Examples | b1' | a1' | 4.6 | 0.05 | 0.17 | 98 | 0.10 | 1.1 | 8 | 30 |
|  | b2' | a2' | 5.0 | 0.46 | 0.19 | 5 | — | — | 8 | 30 |
|  | b3' | a3' | 4.1 | 0.13 | 0.97 | 5 | — | — | 8 | 30 |
|  | b4' | a4' | 4.5 | 0.13 | 0.17 | 98 | 0.08 | 1.2 | 8 | 30 |
|  | b5 | a5' | 4.4 | 0.17 | 0.23 | 99 | 0.07 | 1.1 | 8 | 30 |
|  | b6' | a6' | 0.1 | 0.16 | 0.34 | 100 | 0.06 | 1.2 | 8 | 30 |
|  | b7' | a7' | 9.8 | 0.16 | 0.17 | 10 | — | — | 8 | 30 |
|  | b8' | a8' | 5.1 | 0.14 | 0.18 | 98 | 0.6 | 1.1 | 8 | 30 |
|  | b9' | a9' | 5.2 | 0.03 | 0.18 | 98 | 0.5 | 1.1 | 8 | 30 |
|  | b10' | a10' | 0.0 | 0.01 | 0.05 | 100 | 0 | 2.0 | 8 | 30 |

| | | | Evaluation of characteristics | | | | | | |
|---|---|---|---|---|---|---|---|---|---|
| | | | Plating appearance | | Corrosion resistance (outside) | | | Workability | |
| | | | | | Plane | End | Corrosion | | | Embrittle- ment in |
| | No. | Steel No. | Appear- ance | Pin- hole | sur- face | sur- face | resistance (inside) | Draw bead | Cylinder | secondary working | Remarks |
| Inventive Examples | B1' | A1' | A | A | B | B | B | A | A | A | |
| | B2' | A2' | A | A | B | B | B | B | B | A | |
| | B3' | A3' | A | B | B | B | B | B | B | A | |
| | B4' | A4' | A | A | B | B | B | B | B | A | |
| | B5' | A5' | A | B | B | B | B | B | B | A | |
| | B6' | A6' | A | A | B | B | B | A | A | A | |
| | B7' | A7' | A | A | B | B | B | B | B | A | |
| | B8' | A8' | A | A | B | B | B | A | A | A | |
| | B9' | A9' | A | A | A | B | B | A | A | A | |
| | B10' | A10' | A | A | A | B | B | A | A | A | |
| | B11' | A11' | A | A | A | B | B | A | A | A | |
| | B12' | A12' | A | A | A | B | B | B | B | A | |
| | B13' | A13' | A | A | A | B | B | A | A | A | |
| | B14' | A14' | A | A | A | B | B | A | A | A | |
| | B15' | A15' | A | A | A | B | B | A | A | A | |
| | B16' | A16' | A | A | A | B | B | B | B | A | |
| | B17' | A17' | A | A | A | B | B | A | A | B | |
| | B18' | A18' | A | A | A | B | B | B | B | A | |
| | B19' | A19' | A | A | A | B | B | A | A | A | |
| | B20' | A20' | A | A | A | B | B | B | B | A | |
| | B21' | A21' | A | A | A | A | B | A | A | A | |
| | B22' | A22' | A | A | A | A | B | A | A | A | |
| Comparative Examples | b1' | a1' | A | B | B | X | X | C | X | B | |
| | b2' | a2' | X | X | — | — | — | — | — | — | Plating defects are large (unevaluatable) |
| | b3' | a3' | X | X | — | — | — | — | — | — | Plating defects are large (unevaluatable) |
| | b4' | a4' | A | B | B | B | B | X | X | X | |
| | b5 | a5' | A | B | B | B | B | X | X | X | |
| | b6' | a6' | A | A | B | X | X | A | A | A | |
| | b7' | a7' | X | X | — | — | — | — | — | — | Plating defects are large (unevaluatable) |
| | b8' | a8' | A | B | B | B | B | X | X | X | |
| | b9' | a9' | A | B | B | B | B | X | X | X | |
| | b10' | a10' | A | B | B | X | B | A | A | A | |

*Ratio of alloy phase = Sn-Fe-Q-Zn phase/Sn-Fe-Ni-Zn phase
Underlined values are out of scope of the present invention.

From the results shown in Table 11, in a case where the alloy layer does not satisfy the ratio of the Sn—Fe—Cr—Zn phase (A phase) to the Sn—Fe—Ni—Zn phase (B phase) and the coverage, a good plating appearance is not obtained. In addition, as shown in Comparative Examples b1' to b9' of Table 11, even at the level at which the plating properties were obtained, in a case where the steel composition deviates from the conditions of the present invention, either or both of good corrosion resistance and workability which are desired are not obtained. By satisfying the conditions of the present invention, it is possible to obtain a Sn—Zn-plated steel sheet having a good plating appearance and excellent corrosion resistance and workability.

Example 8

A plated steel sheet was produced in the same method as the manufacturing method described in Example 6 using the steel sheet A1 shown in Table 10, various coating treatments shown below were then performed, and thereafter corrosion resistance and workability were evaluated. The evaluation method is the same as in Example 7.

water-dispersible silica, applying the treatment liquid onto the surface of the steel sheet with a bar coater so as to achieve a predetermined film thickness and a Zr:P:Ce:Si mass ratio of 5:2:1:2 in the film after drying, and drying the resultant at an ambient temperature of 180° C.

c3': A lubricating film containing 20 mass % of colloidal silica and 10 mass % of a polyethylene resin in a polyester-urethane resin film was formed by applying a solution which was the material of the lubricating film onto the surface of the steel sheet so as to achieve a predetermined dry coating film thickness and drying the resultant at an ambient temperature of 240° C. and an attainment sheet temperature of 150° C.

From the results shown in Table 12, Nos. C1' to C4' are plated steel sheets having a predetermined plating composition, adhesion amount, and alloy layer coverage described in the present invention, and satisfy all performances.

Example 9

A plated steel sheet was produced in the same method as the manufacturing method described in Example 7 using the

TABLE 12

| | | | Diffusion alloy layer | | Sn-Zn plated layer | | Chemical Conversion Film | | Evaluation of characteristics | | | | | | | |
|---|---|---|---|---|---|---|---|---|---|---|---|---|---|---|---|---|
| | | | | | | | | | | | Corrosion resistance (outside) | | Corrosion resistance (inside) | Workability | | |
| | | | Ratio | | | | | | Plating appearance | | | | | | | Embrittlement in secondary working |
| | No. | Steel No. | Coverage (%) | of alloy phase (*) | Thickness (µm) | Composition Zn (%) | Adhesion amount (g/m²) | Type | Thickness (µm) | Appearance | Pinhole | Plane surface | End surface | | Draw bead | Cylinder | |
| Inventive Examples | C1' | A1' | 100 | 0.03 | 1.2 | 8 | 40 | c1' | 0.02 | A | A | A | B | B | A | A | A |
| | C2' | A6' | 100 | 0.05 | 1.2 | 8 | 30 | c3' | 1.3 | A | A | A | B | A | A | A | A |
| | C3' | A6' | 100 | 0.05 | 1.2 | 8 | 30 | c2' | 0.2 | A | A | B | B | A | A | A | A |
| | C4' | A6' | 100 | 0.05 | 1.2 | 8 | 30 | c1' | 0.3 | A | A | B | B | A | A | A | A |

*Ratio of alloy phase = Sn-Fe-Cr-Zn phase/Sn-Fe-Ni-Zn phase

[Chemical Conversion Film]

c1': Trivalent chromate film: Formed by using a treatment liquid primarily containing $Cr^{3+}$ and containing water-dispersible silica and phosphoric acid, applying the treatment liquid onto the surface of the steel sheet with a bar coater so as to achieve a predetermined dry film thickness and a Cr:Si:P mass ratio of 1:3:2 in the film after drying, and drying the resultant at an ambient temperature of 240° C.

c2': Chromate-free film: Zr: Formed by using a treatment liquid containing Zr oxide, phosphoric acid, Ce nitrate, and steel sheet A1' shown in Table 10, the film treatment c1' described in Example 8 was then applied, thereafter a coating film was further formed, and corrosion resistance and workability were evaluated. The evaluation method is the same as in Example 7. Regarding the workability, evaluation was omitted because good results had already been obtained for the steel sheet A1'.

TABLE 13

| | | | Diffusion alloy layer | | | Sn-Zn plated layer | | Chemical Conversion Film | Coating Film | | Evaluation of characteristics | | | | |
|---|---|---|---|---|---|---|---|---|---|---|---|---|---|---|---|
| | | | | | | | | | | | Plating appearance | | Corrosion resistance (outside) | | Corrosion resistance (inside) |
| | | | Ratio | | | | | | | | | | | | |
| | No. | Steel No. | Coverage (%) | of alloy phase (*) | Thickness (µm) | Composition Zn (%) | Adhesion amount (g/m²) | Thickness (µm) | Type | Thickness (µm) | Appearance | Pinhole | Plane surface | End surface | |
| Inventive Examples | D1' | A1' | 100 | 0.03 | 1.2 | 8 | 30 | 0.3 | d1' | 10 | A | A | A | A | B |
| | D2' | A1' | 100 | 0.03 | 1.2 | 8 | 30 | 0.3 | d2' | 300 | A | A | A | A | B |
| | D3' | A1' | 100 | 0.03 | 1.2 | 8 | 30 | 0.3 | d1' | 15 | A | A | A | A | B |

TABLE 13-continued

| | | | | | | | | | | | | | | |
|---|---|---|---|---|---|---|---|---|---|---|---|---|---|---|
| D4' | A1' | 100 | 0.03 | 1.2 | 8 | 30 | 0.3 | d1' | 25 | A | A | A | A | B |
| D5' | A1' | 100 | 0.03 | 1.2 | 8 | 30 | 0.3 | d2' | 100 | A | A | A | A | B |
| D6' | A1' | 100 | 0.03 | 1.2 | 8 | 30 | 0.3 | d2' | 200 | A | A | A | A | B |

*Ratio of alloy phase = Sn-Fe-Cr-Zn phase/Sn-Fe-Ni-Zn phase

[Coating Film]

d1': Black coating: Produced by applying a coating primarily containing a styrene-butadiene resin and containing a black pigment to a test piece having a size of 70×150 mm so as to achieve a predetermined film thickness, and baking and drying the resultant under baking conditions of 140° C.×20 minutes.

d2': Chipping resistant coating: Produced by applying a coating primarily containing a urethane resin and a styrene-butadiene resin and containing a black pigment to a test piece having a size of 70×150 mm so as to achieve a predetermined film thickness, and baking and drying the resultant under baking conditions of 140° C.×20 minutes.

From the results shown in Table 13, Nos. D1' to D6' include, in addition to plated steel sheets having a predetermined plating composition, adhesion amount, and alloy layer coverage described in the present invention, the film treatment and coating described in the present invention, and thus satisfy all performances while exhibiting excellent corrosion resistance.

Example 10

Steels having the compositions of A1', A3' to A8', A21', and A22' shown in Table 10 were melted, hot-rolled at a heating temperature of 1150° C. and a finish temperature of 900° C. in hot rolling, and thereafter subjected to sulfuric acid pickling in pickling and hot rolling, and then a cold-rolled steel sheet having a thickness of 0.8 mm is produced in cold rolling. This cold-rolled steel sheet was annealed in annealing to adjust the material, and then subjected to a pickling treatment under various conditions in pickling to produce a pickled cold-rolled steel sheet. The surface state of this pickled cold-rolled steel sheet was obtained as the surface concentration of each element from the integrated value at a depth up to 50 nm from the surface of the steel sheet based on the results measured by GDS as in Example 6.

An Fe—Ni plating was applied to these pickled cold-rolled steel sheets into 1 g/m$^2$ and then hot-dip Sn—Zn plating was performed by the flux method to evaluate the plating properties. The composition of the Fe—Ni plating contained 30 mass % of Ni and the remainder consisting of Fe and impurities. The flux was a 1% HCl solution, and after applying the solution, a $ZnCl_2$—$NH_4Cl$ aqueous solution was applied with a roll. The Zn composition of a plating bath was 8 mass % of Zn. The steel sheet was immersed at a bath temperature of 290° C. and a sheet temperature at the time of immersion in the bath of 60° C., and plated for 10 seconds. Thereafter, the adhesion amount of the plating was adjusted by gas wiping. The external appearance of the hot-dip Sn—Zn plating thus produced was evaluated based on the plating adhesion state by visually observing the surface of each hot-dip plated steel sheet. The plating appearance evaluation method is the same as that described in Example 6. In addition, the coverage of the formed alloy layer was obtained by EPMA surface analysis after plating peeling. Furthermore, for the level at which the plating appearance was good and the performance could be evaluated, corrosion resistance and workability were each evaluated in the same method as in the method described in Example 7.

TABLE 14

| | | | Manu-facturing method | Concentration of elements at surface of pickled and annealed steel sheets | | | Diffusion alloy layer | | | Sn-Zn plated layer | | Chemical Conversion Film | Coating film |
|---|---|---|---|---|---|---|---|---|---|---|---|---|---|
| | | Steel No. | | Cr (%) | Si (%) | Mn (%) | Coverage (%) | Ratio of alloy phase (*) | Thickness (μm) | Composition Zn (%) | Adhesion amount (g/m$^2$) | Thickness (μm) | Thickness (μm) |
| | No. | | | | | | | | | | | | |
| Inventive Examples | E1' | A21' | F2' | 4.7 | 0.13 | 0.32 | 100 | 0.06 | 1.1 | 8 | 30 | 0.3 | 150 |
| | E2' | A22' | F2' | 4.9 | 0.15 | 0.3 | 100 | 0.06 | 1.1 | 8 | 30 | 0.3 | 150 |
| | E3' | A1' | F1' | 4.1 | 0.13 | 0.26 | 100 | 0.04 | 1.1 | 8 | 20 | 0.2 | — |
| | E4' | A6' | F1' | 4.2 | 0.12 | 0.28 | 100 | 0.06 | 1.3 | 8 | 20 | 0.2 | — |
| | E5' | A7' | F1' | 4.0 | 0.10 | 0.30 | 100 | 0.04 | 1.2 | 8 | 20 | 0.2 | — |
| | E6' | A8' | F2' | 4.2 | 0.10 | 0.26 | 100 | 0.05 | 1.3 | 8 | 20 | 0.2 | — |
| Comparative Examples | e1' | A1' | f1' | 7.1 | 0.29 | 0.43 | 5 | — | — | — | — | — | — |
| | e2' | A3' | f1' | 9.8 | 0.22 | 0.44 | 0 | — | — | — | — | — | — |
| | e3' | A4' | f2' | 6 | 0.3 | 0.45 | 5 | — | — | — | — | — | — |
| | e4' | A5' | f2' | 6.2 | 0.28 | 0.89 | 5 | — | — | — | — | — | — |

TABLE 14-continued

| | | | Evaluation of characteristics | | | | | | | |
|---|---|---|---|---|---|---|---|---|---|---|
| | | | Plating appearance | | Corrosion resistance (outside) | | | Workability | | |
| | | | | | | | | | Embrittlement in | |
| No. | Steel No. | | Appearance | Pinhole | Plane surface | End surface | Corrosion resistance (inside) | Draw bead | Cylinder | secondary working | Remarks |
| Inventive Examples | E1' | A21' | A | A | A | A | B | A | A | A | |
| | E2' | A22' | A | A | A | A | B | A | A | A | |
| | E3' | A1' | A | A | B | B | B | A | A | A | |
| | E4' | A6' | A | A | B | B | B | A | A | A | |
| | E5' | A7' | A | A | B | B | B | B | B | A | |
| | E6' | A8' | A | A | B | B | B | A | A | A | |
| Comparative Examples | e1' | A1' | — | — | — | — | — | — | — | — | Plating defects are large (unevaluatable) |
| | e2' | A3' | — | — | — | — | — | — | — | — | Plating defects are large (unevaluatable) |
| | e3' | A4' | — | — | — | — | — | — | — | — | Plating defects are large (unevaluatable) |
| | e4' | A5' | — | — | — | — | — | — | — | — | Plating defects are large (unevaluatable) |

Ratio of alloy phase = Sn-Fe-Cr-Zn phase/Sn-Fe-Ni-Zn phase
Underlined values are out of scope of the present invention.

[Pickling conditions for cold-rolled steel sheet]

F1': Sulfuric acid (100 g/l)+sodium sulfate (100 g/l)+sodium hexafluorosilicate (10 g/l), electrolyzed at a temperature of 50° C. and 10 A/dm$^2$ for 5 seconds F2': Sulfuric acid (120 g/l)+sodium nitrate (120 g/l)+potassium hexafluorosilicate (10 g/l), electrolyzed at a temperature of 60° C. and 30 A/dm$^2$ for 6 seconds f1': Sulfuric acid (100 g/l)+sodium sulfate (100 g/l)+sodium hexafluorosilicate (10 g/l), electrolyzed at a temperature of 30° C. and 10 A/dm$^2$ for 2 seconds f2': Sulfuric acid (100 g/l), immersed at a temperature of 30° C. for 1 minute From the results shown in Table 14, by using the steel having the composition described in the present invention, producing the pickled cold-rolled steel sheet controlled to predetermined surface element concentrations, and performing the plating method described in the present invention, the diffusion alloy layer that leads to an excellent plating appearance is obtained, and the plated steel sheet produced under the conditions exhibits preferable corrosion resistance and workability as a fuel tank of a vehicle. On the other hand, as the results shown in the comparative examples, in a case where the surface element concentrations of the pickled cold-rolled steel sheet did not satisfy the present invention, it was difficult to obtain a good plating appearance, and it was difficult to evaluate corrosion resistance and workability.

BRIEF DESCRIPTION OF THE REFERENCE SYMBOLS

1 Steel sheet
2 Diffusion alloy layer
3 Plated layer
4 Sn—Fe—Cr—Zn phase
5 Sn—Fe—Ni—Zn phase
Y: Spot weld
Z: Seal portion

What is claimed is:

1. A hot-dip Sn—Zn-based alloy-plated steel sheet comprising:
   a steel sheet;
   a diffusion alloy layer provided on one surface of the steel sheet; and
   a Sn—Zn-plated layer provided on the diffusion alloy layer,
   wherein the steel sheet contains, by mass %,
   C: 0.0005% to 0.030%,
   Si: 0.8% or less,
   Mn: 0.10% to 2.0%,
   S: 0.010% or less,
   P: 0.005% to 0.040%,
   Cr: 4.0% to 18.0%,
   Ti: 0% to 0.30%,
   Nb: 0% to 0.040%,
   B: 0% to 0.0030%,
   Al: 0% to 0.30%,
   N: 0% to 0.03%,
   Cu: 0% to 2.0%,
   Ni: 0% to 3.0%,
   Mo: 0% to 2.0%,
   V: 0% to 2.0%, and
   a remainder comprising Fe and impurities,
   the diffusion alloy layer contains Fe, Sn, Zn, Cr, and Ni,
   an area ratio of a Sn—Fe—Cr—Zn phase to a Sn—Fe—Ni—Zn phase in the diffusion alloy layer is 0.01 or more and less than 2.5,
   the diffusion alloy layer has a coverage of 98% or more with respect to the one surface of the steel sheet,
   the Sn—Zn-plated layer contains 1% to 20% of Zn by mass % and a remainder comprising Sn and impurities, and
   an adhesion amount of the Sn—Zn-plated layer is 10 to 80 g/m$^2$.

2. The hot-dip Sn—Zn-based alloy-plated steel sheet according to claim 1,
   wherein the steel sheet contains, by mass %, one or two or more of
   Ti: 0.010% to 0.30%, Nb: 0.001% to 0.040%,
B: 0.0002% to 0.0030%,
Al: 0.01% to 0.30%, and
N: 0.0010% to 0.03%.

3. The hot-dip Sn—Zn-based alloy-plated steel sheet according to claim 1,
wherein the steel sheet contains, by mass %, one or two or more of
Cu: 0.01% to 2.0%,
Ni: 0.01% to 3.0%,
Mo: 0.01% to 2.0%, and
V: 0.01% to 2.0%.

4. The hot-dip Sn—Zn-based alloy-plated steel sheet according to claim 1,
wherein the hot-dip Sn—Zn-based alloy-plated steel sheet has a chemical conversion film having a thickness of 0.02 to 2.0 μm on at least one surface thereof.

5. The hot-dip Sn—Zn-based alloy-plated steel sheet according to claim 1,
wherein the hot-dip Sn—Zn-based alloy-plated steel sheet has a coating film having a thickness of 10 to 300 μm on at least one surface thereof.

6. The hot-dip Sn—Zn-based alloy-plated steel sheet according to claim 1,
wherein the steel sheet contains, by mass %,
Cr: 10.5% to 18.0%.

7. The hot-dip Sn—Zn-based alloy-plated steel sheet according to claim 1,
wherein the steel sheet contains, by mass %,
Cr: 4.0% or more and less than 10.5%,
Cu: 0.01% to 2.0%, and
Ni: 0.01% to 3.0%, and
the area ratio of the Sn—Fe—Cr—Zn phase to the Sn—Fe—Ni—Zn phase in the diffusion layer on the one surface is 0.01 to 2.0.

8. A hot-dip Sn—Zn-based alloy-plated steel sheet comprising:
a steel sheet;
diffusion alloy layers provided on both surfaces of the steel sheet; and
Sn—Zn-plated layer-layers provided on the diffusion alloy layers,
wherein the steel sheet contains, by mass %,
C: 0.0005% to 0.030%,
Si: 0.8% or less,
Mn: 0.10% to 2.0%,
S: 0.010% or less,
P: 0.005% to 0.040%,
Cr: 4.0% to 18.0%,
Ti: 0% to 0.30%,
Nb: 0% to 0.040%,
B: 0% to 0.0030%,
Al: 0% to 0.30%,
N: 0% to 0.03%,
Cu: 0% to 2.0%,
Ni: 0% to 3.0%,
Mo: 0% to 2.0%,
V: 0% to 2.0%, and
a remainder comprising Fe and impurities,
the diffusion alloy layers contain Fe, Sn, Zn, Cr, and Ni,
an area ratio of a Sn—Fe—Cr—Zn phase to a Sn—Fe—Ni—Zn phase in the diffusion alloy layers is 0.01 or more and less than 2.5,
the diffusion alloy layers have a coverage of 98% or more with respect to each of the surfaces of the steel sheet,
the Sn—Zn-plated layers contain 1% to 20% of Zn by mass % and a remainder comprising Sn and impurities, and
an adhesion amount of the Sn—Zn-plated layer is 10 to 80 g/m² on each of the surfaces.

9. The hot-dip Sn—Zn-based alloy-plated steel sheet according to claim 8,
wherein the steel sheet contains, by mass %,
Cr: 4.0% or more and less than 10.5%,
Cu: 0.01% to 2.0%, and
Ni: 0.01% to 3.0%, and
the area ratio of the Sn—Fe—Cr—Zn phase to the Sn—Fe—Ni—Zn phase in the diffusion alloy layers on the both surfaces is 0.01 to 2.0.

* * * * *